(12) United States Patent
Jang et al.

(10) Patent No.: US 10,735,968 B2
(45) Date of Patent: Aug. 4, 2020

(54) METHOD AND APPARATUS FOR SUPPORTING LICENSED-ASSISTED ACCESS TECHNOLOGY IN WIRELESS COMMUNICATION SYSTEM

(71) Applicant: Samsung Electronics Co., Ltd., Gyeonggi-do (KR)

(72) Inventors: Jaehyuk Jang, Suwon-si (KR); Kyeongin Jeong, Yongin-si (KR); Soenghun Kim, Suwon-si (KR); Sangbum Kim, Suwon-si (KR); Hyojin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 15/532,491

(22) PCT Filed: Nov. 10, 2015

(86) PCT No.: PCT/KR2015/012077
§ 371 (c)(1),
(2) Date: Aug. 22, 2017

(87) PCT Pub. No.: WO2016/089019
PCT Pub. Date: Jun. 9, 2016

(65) Prior Publication Data
US 2018/0041906 A1 Feb. 8, 2018

Related U.S. Application Data

(60) Provisional application No. 62/086,057, filed on Dec. 1, 2014.

(51) Int. Cl.
*H04W 16/14* (2009.01)
*H04W 74/08* (2009.01)
(Continued)

(52) U.S. Cl.
CPC .......... *H04W 16/14* (2013.01); *H04W 24/10* (2013.01); *H04W 72/04* (2013.01);
(Continued)

(58) Field of Classification Search
CPC . H04W 16/14; H04W 24/10; H04W 74/0808; H04W 72/085
See application file for complete search history.

(56) References Cited

U.S. PATENT DOCUMENTS 9,867,105 B2 * 1/2018 Lee ................... H04W 36/0061
9,942,901 B2 * 4/2018 Chandrasekhar ........................... H04W 72/0453
(Continued)

FOREIGN PATENT DOCUMENTS

EP 3216238 A1 9/2017

OTHER PUBLICATIONS

Extended European Search Report for European Application No. 15857338.6, dated Oct. 6, 2017. (10 pages).
(Continued)

*Primary Examiner* — Rasheed Gidado

(57) ABSTRACT

The present disclosure relates to a communication technique and system for combining IoT technologies with 5G communication systems to support a higher data rate after 4G communication systems. The present disclosure can be applied to intelligent services based on 5G communication technologies and IoT-related technologies such as smart home, smart building, smart city, smart car or connected car, healthcare, digital education, retail business, and security and safety. Provided are is a method and apparatus for supporting the licensed-assisted access (LAA) technology in a wireless communication system. The method for a user equipment (UE) may include: sending a first report message containing information on whether the LAA technology is
(Continued)

supported to a base station (ENB) supporting a first communication technology; detecting usage of a second communication technology in a first band of the unlicensed spectrum; and sending, upon detecting usage of the second communication technology in the first band, a second report message containing information on usage of the second communication technology to the ENB.

16 Claims, 14 Drawing Sheets

(51) Int. Cl.
    *H04W 24/10*     (2009.01)
    *H04W 72/04*     (2009.01)
    *H04W 88/02*     (2009.01)
    *H04W 88/08*     (2009.01)
    *H04B 7/0413*     (2017.01)
    *H04W 72/08*     (2009.01)

(52) U.S. Cl.
    CPC ....... *H04W 74/0808* (2013.01); *H04W 88/02* (2013.01); *H04W 88/08* (2013.01); *H04B 7/0413* (2013.01); *H04W 72/085* (2013.01)

(56) References Cited

U.S. PATENT DOCUMENTS

| | | | | |
|---|---|---|---|---|
| 10,123,328 | B2* | 11/2018 | Sun | H04W 16/16 |
| 2012/0094681 | A1 | 4/2012 | Freda et al. | |
| 2012/0213116 | A1* | 8/2012 | Koo | H04B 1/1027 370/253 |
| 2013/0007287 | A1 | 1/2013 | Chu et al. | |
| 2013/0195013 | A1* | 8/2013 | Ahn | H04W 72/1215 370/328 |
| 2013/0242738 | A1 | 9/2013 | Chang | |
| 2013/0322279 | A1 | 12/2013 | Chincholi et al. | |
| 2013/0336156 | A1* | 12/2013 | Wei | H04L 5/001 370/252 |
| 2014/0087748 | A1* | 3/2014 | Hong | H04W 72/1215 455/452.1 |
| 2014/0105134 | A1 | 4/2014 | Buddhikot et al. | |
| 2014/0112251 | A1 | 4/2014 | Kim et al. | |
| 2014/0341193 | A1* | 11/2014 | Lee | H04W 24/10 370/336 |
| 2015/0063151 | A1* | 3/2015 | Sadek | H04W 24/08 370/252 |
| 2015/0230065 | A1 | 8/2015 | Zisimopoulos et al. | |
| 2015/0249947 | A1* | 9/2015 | Zhang | H04L 61/3075 370/332 |
| 2015/0351115 | A1* | 12/2015 | Jeon | H04W 48/16 455/450 |
| 2016/0007138 | A1 | 1/2016 | Palanisamy et al. | |
| 2016/0007316 | A1 | 1/2016 | Vaidya et al. | |
| 2016/0088642 | A1* | 3/2016 | Yang | H04W 24/08 455/451 |
| 2017/0251342 | A1 | 8/2017 | Bhalla | |
| 2017/0279565 | A1* | 9/2017 | Han | H04L 1/1877 |

OTHER PUBLICATIONS

Extended European Search Report for European Application No. 15866046.4, dated Nov. 6, 2017. (10 pages).

3rd Generation Partnership Project; Technical Specification Group Core Network and Terminals; Group Communication System Enablers for LTE (GCSE_LTE); MB2 Reference Point; Stage 3 (Release 12); 3GPP TS 29.468 V12.0.1, Oct. 2014; Mobile Competence Centre; 650, Route Des Lucioles; F-06921 Sophia-Antipolis Cedex; France. (28 pages).

3rd Generation Partnership Project; Technical Specification Group Services and System Aspects; Group based Enhancements; (Release 13); 3GPP TR 23.769 V0.3.1, Oct. 2014; Mobile Competence Centre; 650, Route Des Lucioles; F-06921 Sophia-Antipolis Cedex; Franca (33 pages).

NTT DOCOMO, "View on PHY layer options for LAA DL", 3GPP TSG WG1 Meeting #79, R1-145107, San Francisco, USA, Nov. 17-21, 2014. (7 pages).

"LTE; Group Communication System Enablers for LTE (GCSE_LTE); Stage 2 (3GPP TS 23.468 Version 12.2.0 Release 12)," ETSI TS 123 468, V.12.2.0, Sep. 2014, 28 pages.

"Candidate Solutions for LAA Operations, 3GPP TSG RAN WG1 Meeting #78bis," R1-144042, LG Electronics, Ljubljana, Slovenia, Oct. 6-10, 2014, 8 pages.

"Analysis for LAA Candidate Solutions for Coexistence," 3GPP TSG RAN WG1 Meeting #78bis, R1-143828, ZTE, Ljubljana, Slovenia, Oct. 6-10, 2014, 7 pages.

"Inter-Operator and Inter-RAT Co-existence Techniques for LAA Using LTE," 3GPP TSG RAN WG1 Meeting #78bis, R1-144150, Ljubljana, Slovenia, Oct. 6-10, 2014, 8 pages.

"Solutions on Message Delivery to a Group of Devices," SA WG2 Meeting #105, SA WG Temporary Document, S2-143232, Sapporo, Japan, Oct. 13-17, 2014, 4 pages.

Communication From U.S. Appl. No. 14/936,098, filed Nov. 9, 2015, Office Action dated Apr. 28, 2017, 7 pages.

Foreign Communication From a Foreign Counterpart Application, PCT Application No. PCT/KR2015/012077, International Search Report dated Apr. 22, 2016, 4 pages.

European Patent Office, Communication pursuant to Article 94(3) EPC for Application No. EP 15857338.6, dated Sep. 11, 2018, 5 pages.

USPTO, Final Office Action for U.S. Appl. No. 14/936,098, dated Oct. 3, 2017, 12 pages.

USPTO, Non-final Office Action for U.S. Appl. No. 14/936,098, dated Apr. 6, 2018, 15 pages.

3GPP TR 23.769 V1.0.0 (Dec. 2014), 3rd Generation Partnership Project; Technical Specification Group Services and System Aspects; Group based Enhancements (Release 13), 37 pages.

Office Action dated Dec. 3, 2018 in connection with U.S. Appl. No. 14/936,098, 7 pages.

Japan Patent Office, "Notice of Reasons for Refusal," Application No. JP 2017-524424, dated Apr. 15, 2019, 15 pages.

Huawei, Hisilicon, "Solutions on Message delivery to a group of devices," S2-143771 (revision of S2-14xxx), SA WG2 Temporary Document, SA WG2 Meeting #105, Sapporo, Japan, Oct. 13-17, 2014, 4 pages.

Office Action dated Sep. 3, 2019 in connection with Chinese Patent Application No. 201580060319.6, 25 pages.

Communication pursuant to Article 94(3) EPC in connection with European Application No. 15857338.6 dated Mar. 12, 2020, 6 pages.

3GPP TR 23.769 V13.0.0 (Jun. 2015), Technical Report, 3rd Generation Partnership Project; Technical Specification Group Services and System Aspects; Group based Enhancements (Release 13), Jun. 2015, 39 pages.

* cited by examiner

METHOD AND APPARATUS FOR SUPPORTING LICENSED-ASSISTED ACCESS TECHNOLOGY IN WIRELESS COMMUNICATION SYSTEM

CROSS-REFERENCE TO RELATED APPLICATION(S) AND CLAIM OF PRIORITY

The present application claims priority under 35 U.S.C. § 365 to International Patent Application No. PCT/KR2015/012077 filed Nov. 10, 2015, entitled "METHOD AND APPARATUS FOR SUPPORTING LICENSED-ASSISTED ACCESS TECHNOLOGY IN WIRELESS COMMUNICATION SYSTEM", and, through International Patent Application No. PCT/KR2015/012077, to U.S. Provisional Patent Application No. 62/086,057 filed Dec. 1, 2014, each of which are incorporated herein by reference into the present disclosure as if fully set forth herein.

TECHNICAL FIELD

The present invention relates to a wireless communication system and, more particularly, to a method and apparatus that enable the Licensed-Assisted Access (LAA) technology (Long Term Evolution (LTE) enhancements for operation in the unlicensed spectrum) to coexist with existing unlicensed band technologies such as wireless LAN and Bluetooth.

BACKGROUND

To cope with the increasing demand for wireless data traffic after commercialization of 4G communication systems, active efforts are underway to develop enhanced 5G or pre-5G communication systems. As such, 5G or pre-5G communication systems are referred to as beyond 4G communication systems or post LTE systems. To achieve high data rates, use of the extremely high frequency (mmWave) band (e.g. 60 GHz band) is expected in a 5G communication system. To reduce propagation pathloss and to increase propagation distance at the mmWave band, use of various technologies such as beamforming, massive MIMO, full dimensional MIMO (FD-MIMO), array antenna, analog beamforming and large scale antenna are under discussion for 5G communication systems. To enhance system networks, various technologies such as evolved or advanced small cell, cloud radio access network (cloud RAN), ultra-dense network, device-to-device (D2D) communication, wireless backhaul, moving network, cooperative communication, Coordinated Multi-Points (CoMP) and interference cancellation are under development for 5G communication systems. In addition, for 5G communication systems, hybrid FSK and QAM modulation (FQAM) and sliding window superposition coding (SWSC) are under development for advanced coding modulation (ACM), and filter bank multi carrier (FBMC), non-orthogonal multiple access (NOMA) and sparse code multiple access (SCMA) are under development for advanced access.

Meanwhile, the Internet is evolving from a human centered network where humans create and consume information into the Internet of Things (IoT) where distributed elements or things process and exchange information. Big data processing through cloud servers and IoT technology are being combined into the Internet of Everything (IoE). To realize IoT services, base technologies such as sensing, wired/wireless communication and network infrastructure, service interfacing and security are needed, and technologies interconnecting things such as sensor networks, Machine-to-Machine (M2M) or Machine Type Communication (MTC) are under development. In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine or machine type communication are being realized by use of 5G communication technologies including beamforming, MIMO and array antennas. Application of cloud RANs to big data processing may be an instance of convergence of 5G communication technology and IoT technology.

In recent years, with rapid advances in wireless communication technologies, mobile communication systems have evolved across generations. Currently, the long term evolution (LTE) system attracts attention as a fourth generation mobile communication technology. To meet explosive growth in traffic demand, various techniques including carrier aggregation (CA) have been introduced to the LTE system. In most cases, a single carrier is used in communication between a user equipment (UE) and a base station (eNB). When carrier aggregation is employed, a primary carrier and one or more secondary carriers may be used in communication between a user equipment (UE) and a base station (ENB), significantly increasing the data transfer rate by an amount corresponding to the number of secondary carriers. In LTE, the primary carrier is termed a primary cell (PCell), and a secondary carrier is termed a secondary cell (SCell). A CA-capable UE may connect to a single PCell and up to four SCells.

The LTE system is a communication system that originally operates in a licensed frequency band allocated by the government. Recently, to meet explosive growth in traffic demand, an active discussion is under way about the use of the LTE technology in the unlicensed frequency band, which is currently used for wireless LANs, Bluetooth, and the like. This is referred to as Licensed-Assisted Access (LAA) to unlicensed spectrum.

To combine carrier aggregation with LAA, it is possible to consider a scenario where the PCell uses a licensed band frequency and the SCell uses an unlicensed band frequency on the basis of LAA.

However, the unlicensed band is already populated by different types of systems such as Wi-Fi and Bluetooth. While a UE is using a Wi-Fi network operating at a specific frequency of the unlicensed band, when an LTE ENB configures the UE with an LAA cell operating at the same unlicensed band frequency, it may be not possible to simultaneously utilize the two technologies at the same frequency.

SUMMARY

The present invention has been made in view of the above problem. Accordingly, an aspect of the present invention is to provide a method that enables coexistence between the LAA technology supported by a wireless mobile communication system and different technologies used in a UE.

In accordance with an aspect of the present invention, there is provided a method for a user equipment (UE) in a wireless communication system. The method may include:

sending a first report message containing information on whether the licensed-assisted access (LAA) technology is supported by the UE to a base station (ENB) supporting a first communication technology; detecting usage of a second communication technology in a first band of the unlicensed spectrum; and sending, upon detecting usage of the second communication technology in the first band, a second report message containing information on usage of the second communication technology to the ENB.

In accordance with another aspect of the present invention, there is provided a method for a base station (ENB) in a wireless communication system. The method may include: receiving a first report message containing information on whether the LAA technology is supported from a user equipment (UE); receiving a second report message containing information on usage of a second communication technology from the UE; and determining not to allocate resources for using a first communication technology in a first band according to the second report message.

In accordance with another aspect of the present invention, there is provided a method of reference signal measurement on unlicensed spectrum for a user equipment (UE) in a wireless communication system. The method may include: receiving a message containing information on the threshold of the reference signal strength for measurement on the unlicensed spectrum from a base station (ENB); comparing the received signal strength on the unlicensed spectrum with the threshold contained in the received message; and measuring the reference signal on the unlicensed spectrum according to the comparison result.

In accordance with another aspect of the present invention, there is provided a method of reference signal measurement configuration on unlicensed spectrum for a base station (ENB) in a wireless communication system. The method may include sending a message containing information on the threshold of the reference signal strength for measurement on the unlicensed spectrum, wherein the information on the threshold of the reference signal strength is used by a user equipment (UE) to compare the received signal strength on the unlicensed spectrum with the threshold contained in the received message and to measure the reference signal on the unlicensed spectrum according to the comparison result.

In accordance with another aspect of the present invention, there is provided a user equipment (UE) in a wireless communication system. The user equipment may include: a transceiver unit to send and receive a signal; and a control unit to perform a process of controlling the transceiver unit to send a first report message containing information on whether the licensed-assisted access (LAA) technology is supported to a base station (ENB) supporting a first communication technology, detecting usage of a second communication technology in a first band of the unlicensed spectrum, and controlling, upon detecting usage of the second communication technology in the first band, the transceiver unit to send a second report message containing information on usage of the second communication technology to the ENB.

In accordance with another aspect of the present invention, there is provided a base station (ENB) in a wireless communication system. The ENB may include: a transceiver unit to send and receive a signal; and a control unit to perform a process of controlling the transceiver unit to receive a first report message containing information on whether the LAA technology is supported from a user equipment (UE), controlling the transceiver unit to receive a second report message containing information on usage of a second communication technology from the UE, and determining not to allocate resources for using a first communication technology in a first band of the unlicensed spectrum according to the second report message.

In accordance with another aspect of the present invention, there is provided a user equipment (UE) supporting reference signal measurement on unlicensed spectrum in a wireless communication system. The UE may include: a transceiver unit to send and receive a signal; and a control unit to perform a process of controlling the transceiver unit to receive a message containing information on the threshold of the reference signal strength for measurement on the unlicensed spectrum from a base station (ENB), comparing the received signal strength on the unlicensed spectrum with the threshold contained in the received message, and measuring the reference signal on the unlicensed spectrum according to the comparison result.

In accordance with another aspect of the present invention, there is provided a method of reference signal measurement configuration on unlicensed spectrum for a base station (ENB) in a wireless communication system. The method may include sending a message containing information on the threshold of the reference signal strength for measurement on the unlicensed spectrum, wherein the information on the threshold of the reference signal strength is used by a user equipment (UE) to compare the received signal strength on the unlicensed spectrum with the threshold contained in the received message and to measure the reference signal on the unlicensed spectrum according to the comparison result.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGURES X through X, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present invention are described in detail with reference to the accompanying drawings. Detailed descriptions of well-known functions and structures incorporated herein may be omitted to avoid obscuring the subject matter of the present invention.

Next, a description is given of schemes proposed for enabling a Licensed-Assisted Access (LAA) system like the LTE system to share an unlicensed band with non-LTE devices like Wi-Fi devices.

In the first scheme, the UE reports information regarding supported bands, whether LAA is supported, and whether one of the supported bands is being used by a non-LAA technology like Wi-Fi to the ENB in advance. Then, the ENB determines whether to configure a LAA cell in a corresponding band.

In the second scheme, the UE reports information regarding supported bands and whether LAA is supported to the ENB, and the ENB configures the UE with signal strength/quality measurement on the supported bands. When one of the bands to be measured is used by a non-LAA technology, the UE reports this to the ENB. Then, the ENB determines whether to configure a LAA cell in the corresponding band.

In the third scheme, the UE reports information on whether LAA is supported to the ENB, and the ENB configures the UE with signal strength/quality measurement on the bands supported by the UE. When one of the bands to be measured is used by a non-LAA technology, the UE suspends the ongoing unlicensed band operation, performs measurement on the indicated unlicensed band, and resumes the suspended unlicensed band operation. Thereafter, when the ENB configures a LAA cell, the UE determines whether the corresponding unlicensed band is being used by a non-LAA technology. When the corresponding unlicensed band is being used, according to user preferences or priorities, the UE may report failure of LAA cell configuration, or utilize the configured LAA cell after a preset time (in the case of Wi-Fi transmission), after changing the operating frequency of the non-LAA technology (in the case of Wi-Fi channel sensing), or after stopping the non-LAA operation. When the corresponding unlicensed band is not being used, the UE may use the configured LAA cell.

Next, a detailed description is given of the above three schemes.

Figure 1:
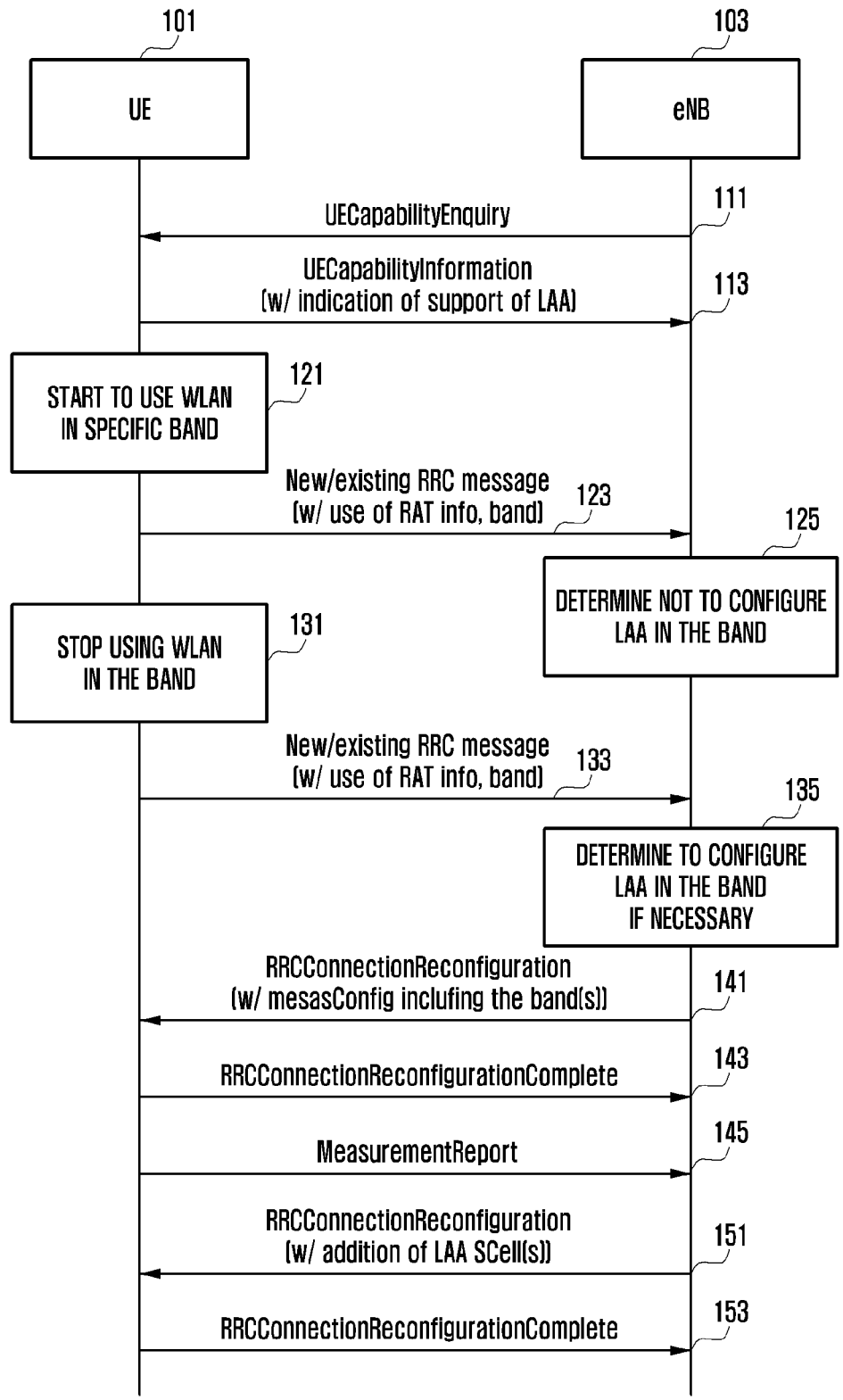
FIG. 1 is a sequence diagram of a scheme for enabling an LTE ENB to share an unlicensed band with non-LTE devices according to an embodiment of the present invention.

FIG. 1 is a sequence diagram of Scheme 1 that enables the LAA system to share an unlicensed band with a non-LAA technology according to an embodiment of the present invention.

In the following description, the LAA system is described as a base station (ENB) of the LTE system.

Referring to FIG. 1, at step 111, the UE 101 receives a request message inquiring about supported functions from the ENB 103. At step 113, the UE 101 sends a report message indicating its capabilities to the ENB 103.

For example, the UE 101 may send the ENB 103 information on an available band among unlicensed bands.

Here, the request message may be a UECapabilityEnquiry message of the Radio Resource Control (RRC) layer managing control messages exchanged between the UE and the ENB, and the report message may be a UECapabilityInformation message of the RRC layer. The UECapabilityInformation message may contain information on whether LAA is supported by the UE 101.

Thereafter, when the UE 101 supports LAA, it monitors utilization of an unlicensed band. Here, unlicensed bands are radio bands reserved for the use of radio frequency (RF) energy for industrial, scientific, medical and household purposes, and are usable without government licenses. Wi-Fi or Bluetooth devices use these unlicensed bands. The unlicensed bands include the 2.4 GHz band and the 5 GHz band. When the UE 101 starts to use a wireless LAN (WLAN) at step 121, it reports WLAN usage to the ENB 103 at step 123.

For example, when the user issues a WLAN start command, the UE 101 may determine that WLAN usage is started in a specific unlicensed band and send a message indicating the determination result to the ENB 103.

The message for reporting WLAN usage may be a newly defined RRC layer message or be an existing RRC layer message like a MeasurementReport message used for measurement reporting.

The report message may include information on the currently used non-LAA technology (e.g. WLAN or Bluetooth) and the frequency used for the non-LAA technology. The frequency information may correspond to a measurement object identifier or detailed frequency information defined in the LTE standard. Upon reception of the report message, at step 125, the ENB 103 does not configure the UE 101 with a LAA cell in the currently used band.

Thereafter, when a change occurs in the usage state of the unlicensed band (e.g. the UE 101 stops using the unlicensed band, changes the operating frequency thereof, or initiates use of a new frequency thereof) at step 131, the UE 101 sends a usage state change report message to the ENB 103 at step 133.

The message for reporting usage state change may be a newly defined RRC layer message or be an existing RRC layer message like a MeasurementReport message used for measurement reporting.

At step 135, as an example of usage state change, it is assumed that the unlicensed band is not used by a non-LAA technology.

In this regard, at step 141, for measurement on the unlicensed band, the ENB 103 sends a configuration message for signal strength measurement to the UE 101.

At step 143, the UE 101 sends a configuration complete message to the ENB 103. At step 145, the UE 101 sends the ENB 103 a measurement report containing information on signal strength/quality measurements on the unlicensed band according to the measurement reporting criteria.

Here, the configuration message for measurement may be a RRCConnectionReconfiguration message, the configuration complete message may be a RRCConnectionReconfigurationComplete message, and the measurement report message may be a RRC layer MeasurementReport message.

According to the reported signal strength/quality information, at step 151, to additionally configure the UE 101 with LAA in the unlicensed band, the ENB 103 sends a configuration message indicating LAA cell addition to the UE 101.

At step 153, the ENB 103 receives a configuration complete message from the UE 101. Here, the configuration message may be a RRCConnectionReconfiguration message, and the configuration complete message may be a RRCConnectionReconfigurationComplete message.

As described above, the ENB may configure the UE to additionally use the LAA technology in the currently available unlicensed band.

Although not shown in FIG. 1, after the LAA technology is configured in the unlicensed band, upon reception of a message indicating that the unlicensed band is used by a non-LAA technology (e.g. message used at step 123 or 133), the ENB may send a message indicating release of the unlicensed band from LAA usage.

Figure 2:
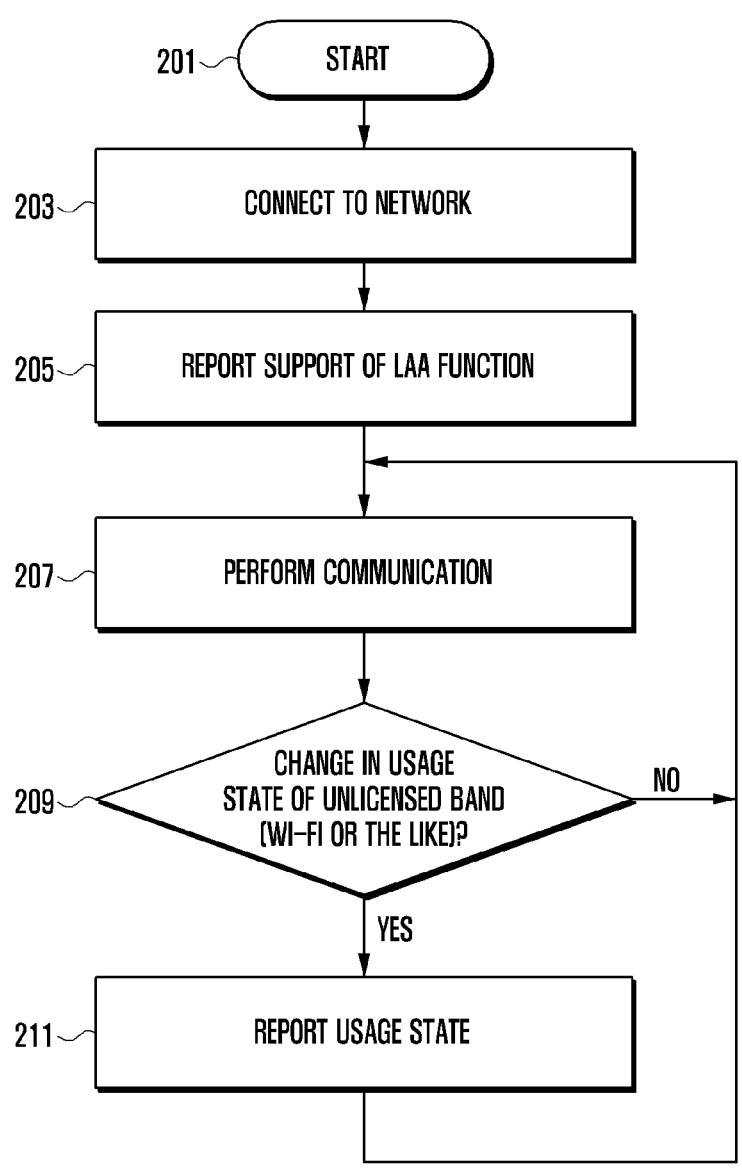
FIG. 2 is a flowchart of a status report procedure for a UE to enable an LTE ENB to share an unlicensed band with non-LTE devices according to an embodiment of the present invention.

FIG. 2 is a flowchart depicting UE operations for Scheme 1 enabling coexistence between LAA and non-LAA technologies as a proposed embodiment of the present invention.

At step 203, the UE connects to the LTE network. At step 205, the UE sends a report indicating whether LAA is supported to the network. For example, the UE may send a message indicating that LAA is supported to the corresponding ENB.

Thereafter, at step 207, the UE communicates with the ENB while monitoring utilization of the unlicensed band with respect to Wi-Fi or Bluetooth at step 209. When a change occurs in the usage state of the unlicensed band, at step 211, the UE reports a usage state change to the network.

Examples of a usage state change may include starting use of the unlicensed band, stopping use of the unlicensed band, changing the operating frequency of the unlicensed band, and starting to use a new frequency of the unlicensed band. The message for reporting usage state change may be a newly defined RRC layer message or be an existing RRC layer message like a MeasurementReport message used for measurement reporting.

The report message may include information on the currently used non-LAA technology (e.g. Wi-Fi or Bluetooth) and the frequency used for the non-LAA technology. The frequency information may correspond to a measurement object identifier or detailed frequency information defined in the LTE standard. Upon reception of the report message, the ENB does not configure the UE with a LAA cell in the currently used band.

Figure 3:
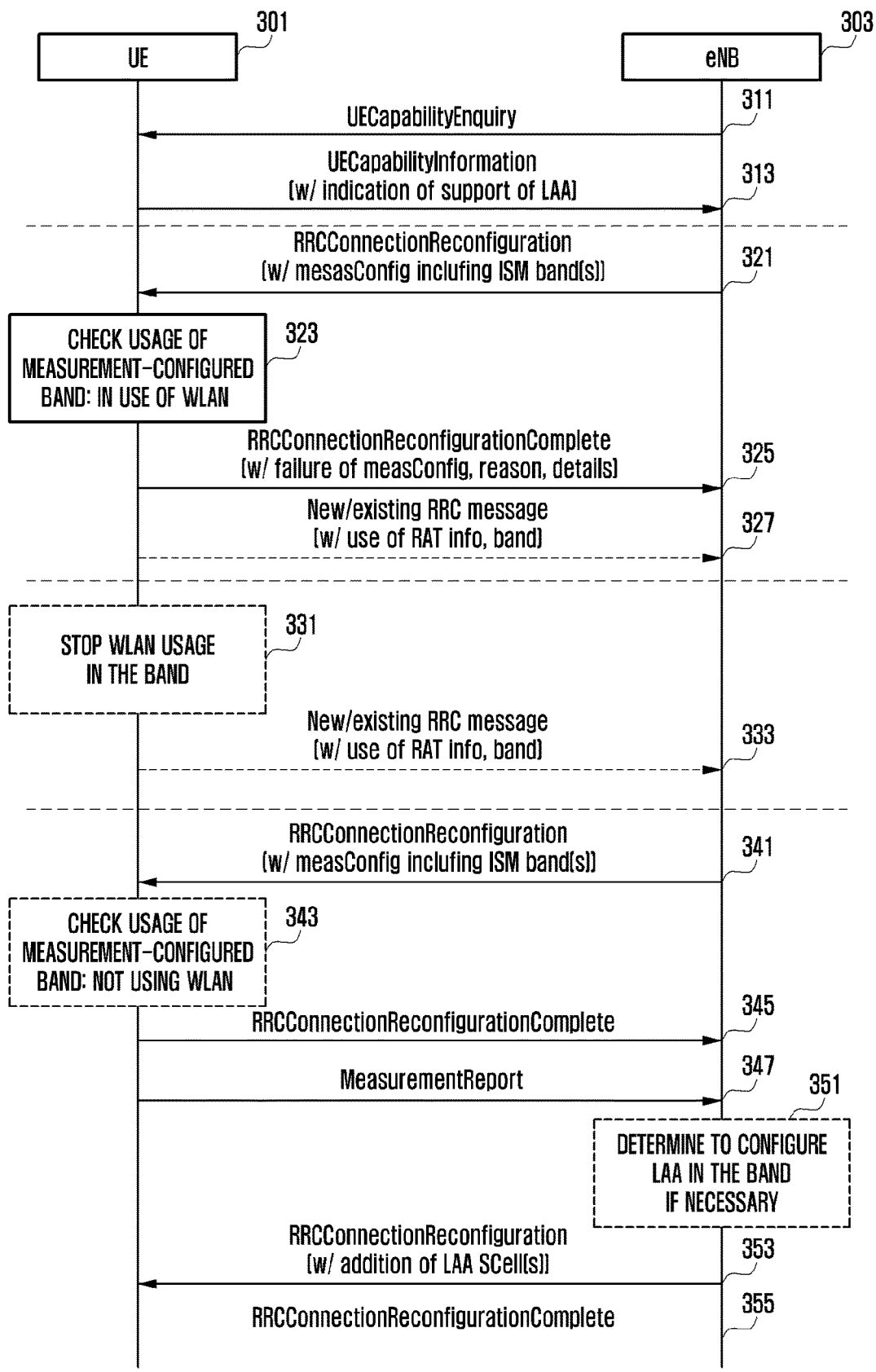
FIG. 3 is a sequence diagram of a scheme for enabling an LTE ENB to share an unlicensed band with non-LTE devices according to another embodiment of the present invention.

FIG. 3 is a sequence diagram for Scheme 2 enabling coexistence between LAA and non-LAA technologies as a proposed embodiment of the present invention.

Referring to FIG. 3, at step 311, the UE 301 receives a request message inquiring about supported functions from the ENB 303. At step 313, the UE 301 sends a report message indicating its capabilities to the ENB 303.

For example, the UE 301 may send the ENB 303 information on a band available to LAA. Specifically, the UE 301 may send the ENB 303 information on an available band among the unlicensed bands.

Here, the request message may be a UECapabilityEnquiry message of the RRC layer, and the report message may be a UECapabilityInformation message of the RRC layer.

The UECapabilityInformation message may contain information on whether LAA is supported by the UE 301. Alternatively, the UECapabilityInformation message may contain information on the frequency band available to LAA in the UE 301. For example, the UE 301 may send the ENB 303 information on the frequency band or band number available to the LAA technology.

Thereafter, upon determining that the UE 301 supports the LAA technology, at step 321, for measurement on the unlicensed band, the ENB 303 sends a configuration message indicating signal strength/quality measurement to the UE 301. Here, the configuration message for measurement may be a RRCConnectionReconfiguration message of the RRC layer.

Upon reception of the configuration message for measurement, at step 323, the UE 301 checks whether the unlicensed band is being used by a non-LAA technology. If the unlicensed band is being used by a non-LAA technology, at step 325, the UE 301 sends a report message indicating measurement configuration failure (e.g. owing to being used by a non-LAA technology) to the ENB 303. Here, the report message may be a RRCConnectionReconfigurationComplete message of the RRC layer, or be a newly defined RRC layer message.

The report message may contain a failure indication, failure cause description (e.g. non-LAA technology occupying the unlicensed band), and detailed information on the unlicensed band being used.

Thereafter, when use of the unlicensed band is stopped or a usage state change occurs in the unlicensed band at step 331, the UE 301 reports this to the ENB 303 at step 333.

For example, when the user issues a Wi-Fi stop command, the UE 301 may send a report message indicating Wi-Fi usage stoppage in the unlicensed band to the ENB 303.

When a usage state change occurs in the unlicensed band, the UE 301 may send a report message indicating the state change to the ENB 303 without receiving a request message as shown at step 311.

The message for reporting usage change may be a newly defined RRC layer message or be an existing RRC layer message like a MeasurementReport message used for measurement reporting.

At step 341, for measurement on the unlicensed band, the ENB 303 sends a configuration message indicating signal strength/quality measurement to the UE 301 supporting the LAA technology. Here, the configuration message for measurement may be a RRCConnectionReconfiguration message of the RRC layer.

Upon reception of the configuration message, at step 343, the UE 301 determines whether the unlicensed band is being used by a non-LAA technology. Upon determining that the unlicensed band is not being used by a non-LAA technology or upon determining that the LAA technology is applicable although the unlicensed band is being used by a non-LAA technology, at step 345, the UE 301 sends a configuration complete message to the ENB 303. Here, the configuration complete message may be a RRCConnectionReconfigurationComplete message of the RRC layer.

Thereafter, at step 347, the UE 301 sends the ENB 303 a measurement report containing information on signal strength/quality measurements on the unlicensed band according to the measurement reporting criteria. Here, the measurement report message may be a MeasurementReport message.

According to the reported signal strength/quality information, at step 351, the ENB 303 determines to additionally configure the UE 301 with LAA in the unlicensed band. At step 353, the ENB 303 sends a configuration message indicating LAA cell addition to the UE 301. At step 355, the ENB 303 receives a configuration complete message from the UE 301. Here, the configuration message may be a RRCConnectionReconfiguration message, and the configuration complete message may be a RRCConnectionReconfigurationComplete message. Thereby, the ENB 303 may configure the UE 301 to additionally use the LAA technology in the currently available unlicensed band.

Figure 4:
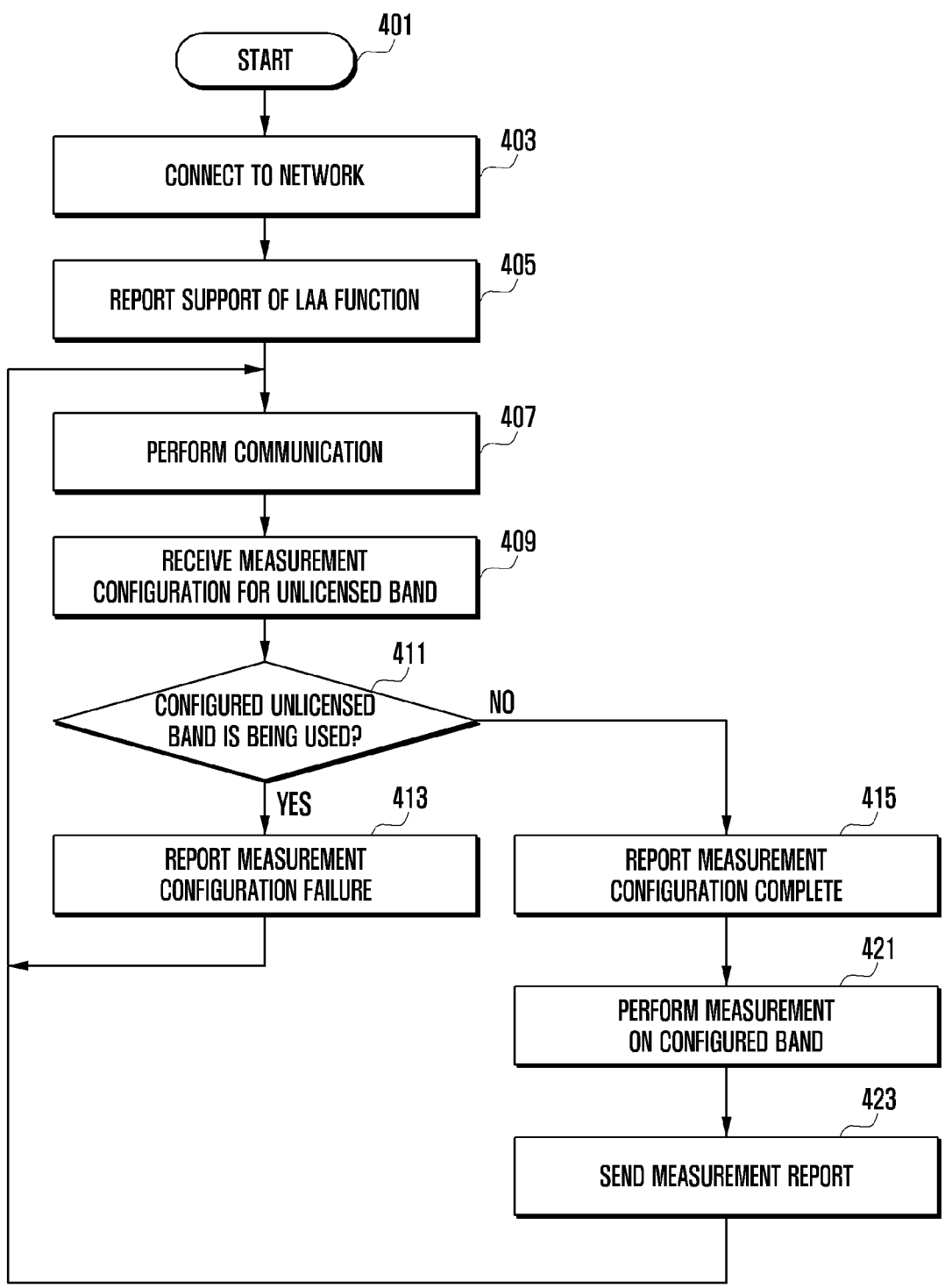
FIG. 4 is a flowchart of a status report procedure for a UE to enable an LTE ENB to share an unlicensed band with non-LTE devices according to another embodiment of the present invention.

FIG. 4 is a flowchart depicting UE operations for Scheme 2 enabling coexistence between LAA and non-LAA technologies as a proposed embodiment of the present invention.

At step 403, the UE connects to the LTE network. At step 405, the UE sends a report indicating whether LAA is supported to the network. At step 407, the UE communicates with the ENB. At step 409, the UE receives a measurement configuration message for the unlicensed band from the ENB.

Upon reception of the measurement configuration message, at step 411, the UE determines whether the unlicensed band to be measured is being used by a non-LAA technology such as Wi-Fi or Bluetooth. Upon determining that the unlicensed band is being used by a non-LAA technology, at step 413, the UE sends a report message indicating measurement configuration failure to the network.

For example, if the unlicensed band to be measured is being used by Wi-Fi or Bluetooth, the UE may send a report message indicating measurement failure to the ENB.

Here, the report message may be a RRCConnectionReconfigurationComplete message of the RRC layer, or be a newly defined RRC layer message. The report message may contain a failure indication, failure cause description (e.g. non-LAA technology occupying the unlicensed band), and detailed information on the unlicensed band being used.

Upon determining that the unlicensed band is not being used by a non-LAA technology or upon determining that the LAA technology is applicable although the unlicensed band is being used by a non-LAA technology, at step 415, the UE sends a configuration complete message to the ENB. Here, the configuration complete message may be a RRCConnectionReconfigurationComplete message of the RRC layer.

At step 421, the UE performs measurement on the unlicensed band. If the measurement reporting criteria are satisfied, at step 423, the UE sends the ENB a measurement report containing information on the measurement result. Thereafter, upon reception of a configuration message indicating use of the unlicensed band for LAA from the ENB, the UE configures a LAA cell based on the unlicensed band.

Additionally, when the unlicensed band is used by Wi-Fi or Bluetooth, the UE may send a report message indicating measurement configuration failure to the network. Thereafter, the UE may sense the unlicensed band to be released from use by Wi-Fi or Bluetooth.

In this case, without receiving a separate measurement configuration message from the ENB, the UE may send a report message indicating enablement of measurement configuration to the ENB within a preset time after sensing release from use in the unlicensed band.

Upon reception of the report message, the ENB may send a measurement configuration message for the unlicensed band to the UE. Then, the UE may configure measurement parameters for the unlicensed band and send a measurement report to the ENB.

Thereafter, upon reception of a configuration message indicating use of the unlicensed band for LAA from the ENB, the UE may configure a LAA cell based on the unlicensed band.

Figure 5:
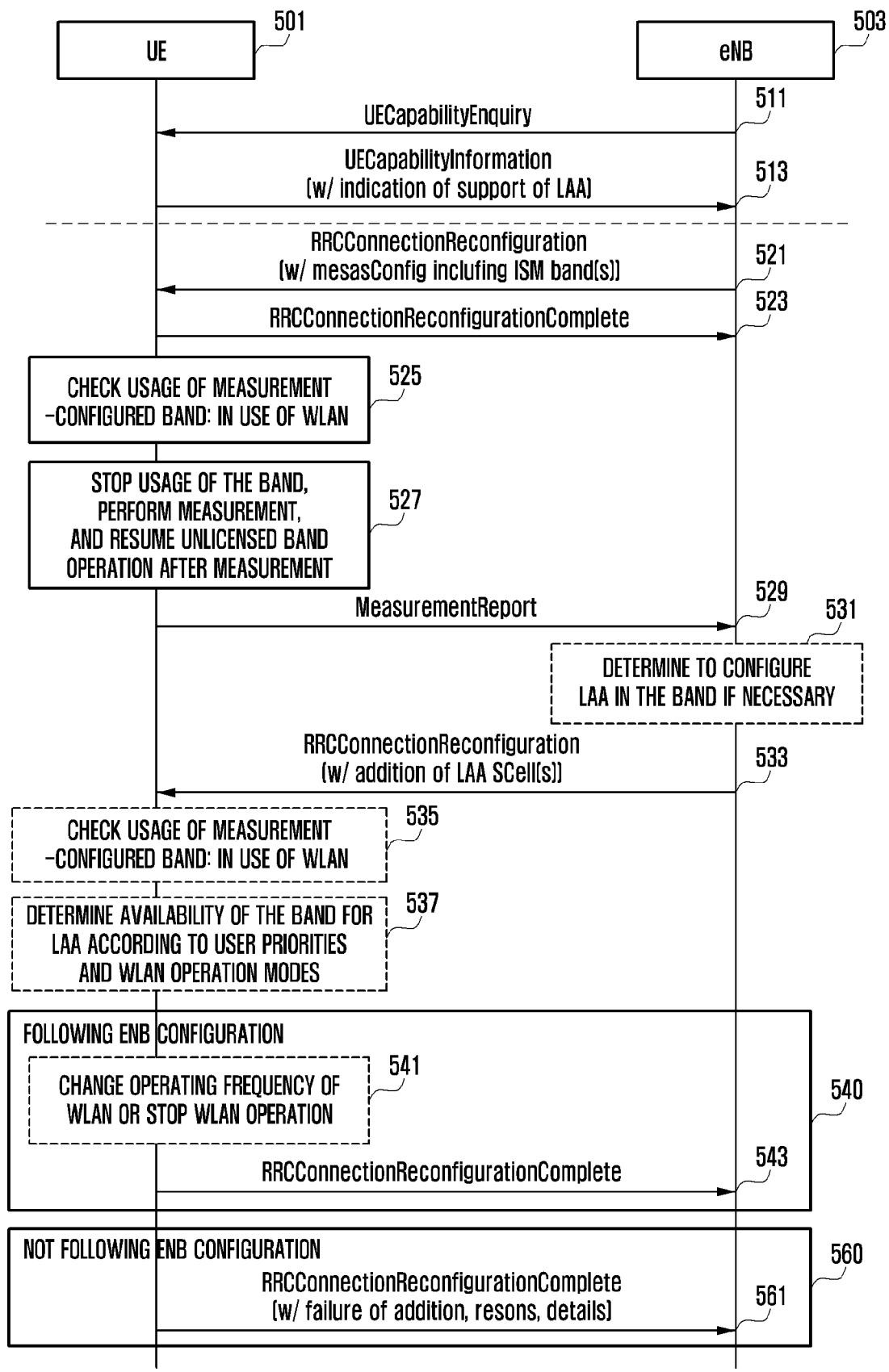
FIG. 5 is a sequence diagram of a scheme for enabling an LTE ENB to share an unlicensed band with non-LTE devices according to another embodiment of the present invention.

FIG. 5 is a sequence diagram for Scheme 3 enabling coexistence between LAA and non-LAA technologies as a proposed embodiment of the present invention.

Referring to FIG. 5, at step 511, the UE 501 receives a request message inquiring about supported functions from the ENB 503. At step 513, the UE 501 sends a report message indicating its capabilities to the ENB 503. Here, the request message may be a UECapabilityEnquiry message of the RRC layer, and the report message may be a UECapabilityInformation message of the RRC layer. The UECapabilityInformation message may contain information on whether LAA is supported by the UE 501.

Thereafter, upon determining that the UE 501 supports the LAA technology, at step 521, for measurement on the unlicensed band, the ENB 503 sends a configuration message indicating signal strength/quality measurement to the UE 501. Here, the configuration message for measurement may be a RRCConnectionReconfiguration message of the RRC layer. Upon reception of the configuration message for measurement, at step 523, the UE 501 sends a configuration complete message to the ENB 503. Here, the configuration complete message may be a RRCConnectionReconfigurationComplete message of the RRC layer.

After sending the configuration complete message, at step 525, to initiate measurement on the unlicensed band, the UE 501 determines whether the unlicensed band is being used by a non-LAA technology. If the unlicensed band is being used by a non-LAA technology, at step 527, the UE 501 suspends using the unlicensed band through the non-LAA technology, performs measurement on the unlicensed band, and resumes using the unlicensed band through the non-LAA technology after measurement completion.

After measurement, at step 529, the UE 501 sends a measurement report containing the measurement result to the ENB 503 if the measurement reporting criteria are satisfied. Here, the measurement report message may be a MeasurementReport message.

According to the reported signal strength/quality information, at step 531, the ENB 503 determines to additionally configure the UE 501 with LAA in the unlicensed band. At step 533, the ENB 503 sends a configuration message indicating LAA cell addition to the UE 501. Here, the configuration message may be a RRCConnectionReconfiguration message.

Upon reception of the configuration message, at step 535, the UE 501 determines whether the unlicensed band is being used by a non-LAA technology. If the unlicensed band is being used by a non-LAA technology, at step 537, the UE 501 determines whether the unlicensed band is usable for the LAA technology according to user priorities and Wi-Fi operation modes. Here, the Wi-Fi operation mode indicates whether the unlicensed band is being used only for Wi-Fi channel sensing or being used for actual transmission through a Wi-Fi access point. For example, when the unlicensed band is being used for Wi-Fi channel sensing, the UE 501 may use the unlicensed band for the LAA technology. When the unlicensed band is being used for actual Wi-Fi transmission, the UE 501 may not use the unlicensed band for the LAA technology.

To follow the direction of the configuration message sent by the ENB 503 at step 533 (as indicated by indicia 540), at step 541, only if needed to circumvent the non-LAA technology currently using the unlicensed band, the UE 501 changes the operating frequency of the non-LAA technology or stops operation of the non-LAA technology. At step 543, the UE 501 sends a report message indicating configuration enablement as requested to the ENB 503. The report message may be a RRCConnectionReconfigurationComplete message.

When the unlicensed band is being used by a non-LAA technology for channel sensing, the UE 501 may also send a report message indicating configuration enablement as requested to the ENB 503.

Not to follow the direction of the configuration message sent by the ENB 503 at step 533 (as indicated by indicia 560), at step 561, the UE 501 sends a report message indicating configuration failure to the network. Here, the report message may be a RRCConnectionReconfigurationComplete message of the RRC layer, or be a newly defined RRC layer message. The report message may contain a failure indication, failure cause description (e.g. non-LAA technology occupying the unlicensed band), and detailed information on the unlicensed band being used.

Thereby, the ENB may configure the UE to additionally use the LAA technology in the currently available unlicensed band.

Figure 6:
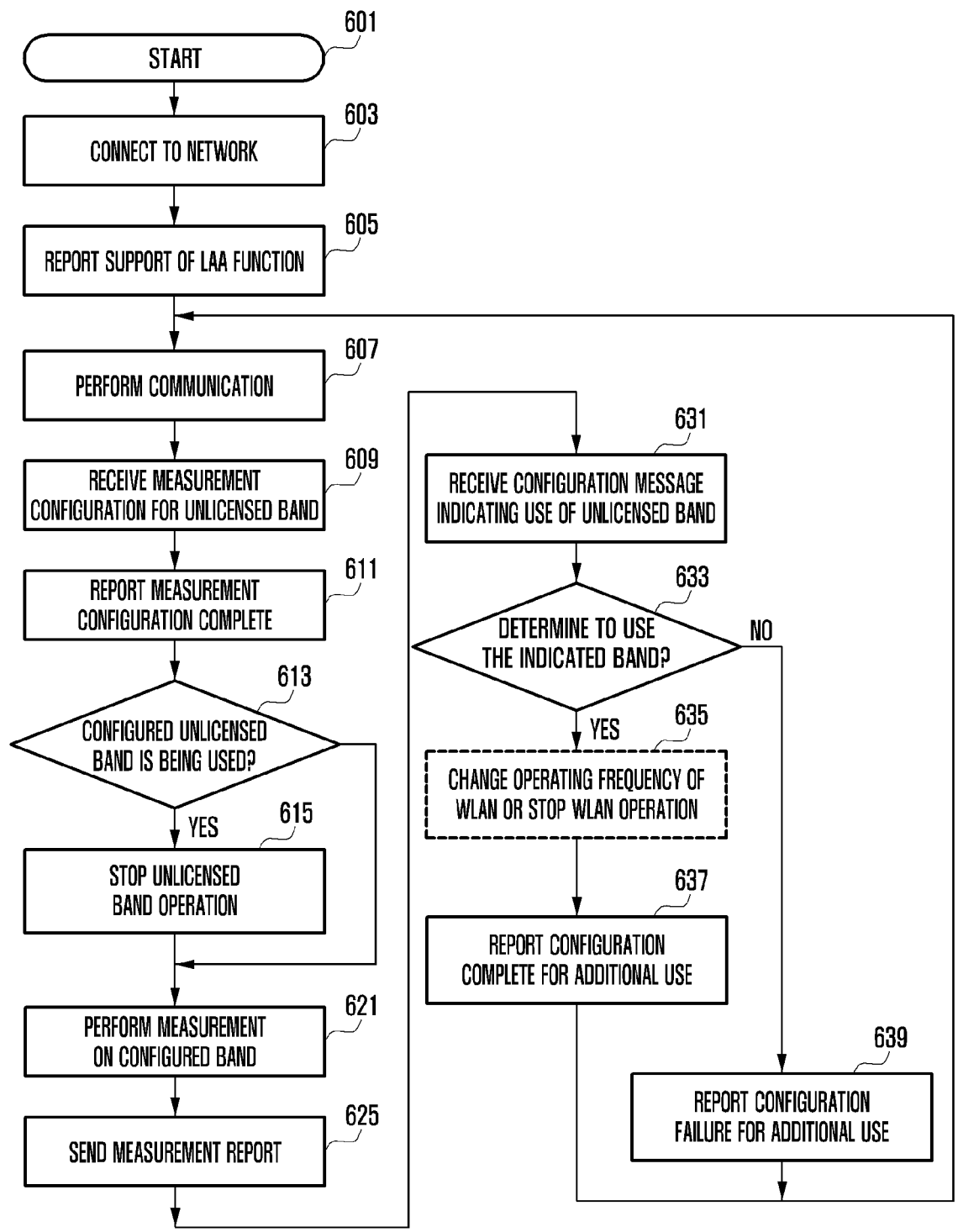
FIG. 6 is a flowchart of a status report procedure for a UE to enable an LTE ENB to share an unlicensed band with non-LTE devices according to another embodiment of the present invention.

FIG. 6 is a flowchart depicting UE operations for Scheme 3 enabling coexistence between LAA and non-LAA technologies as a proposed embodiment of the present invention.

At step 603, the UE connects to the LTE network. At step 605, the UE sends a report message indicating whether LAA is supported to the network. At step 607, the UE communicates with the ENB. At step 609, the UE receives a measurement configuration message for the unlicensed band from the ENB. At step 611, the UE sends a configuration complete message to the ENB.

At step 613, the UE checks whether the unlicensed band is being used by a non-LAA technology. If the unlicensed band is being used by a non-LAA technology, at step 615, the UE suspends the non-LAA operation. At step 621, the UE performs measurement on the unlicensed band. At step 625, the UE sends the ENB a measurement report containing information on the measurement result according to the measurement reporting criteria.

Thereafter, at step 631, the UE receives a configuration message indicating use of the unlicensed band for LAA from the ENB. At step 633, the UE determines whether to use the unlicensed band for the LAA technology.

Upon determining to use the unlicensed band for the LAA technology, at step 635, only if needed to circumvent the non-LAA technology currently using the unlicensed band, the UE changes the operating frequency of the non-LAA technology or stops operation of the non-LAA technology.

At step 637, the UE sends a configuration complete message to the ENB. This message may be a RRCConnectionReconfigurationComplete message.

Upon determining not to use the unlicensed band for the LAA technology, at step 639, the UE sends a report message indicating configuration failure to the network. Here, the report message may be a RRCConnectionReconfigurationComplete message of the RRC layer, or be a newly defined RRC layer message. The report message may contain a failure indication, failure cause description (e.g. non-LAA technology occupying the unlicensed band), and detailed information on the unlicensed band being used.

The proposed schemes enable the unlicensed band to be utilized simultaneously by different technologies such as LAA cell and Wi-Fi or to be utilized only by one thereof if a collision occurs. Thereby, the unlicensed band can be utilized by LAA and non-LAA technologies.

Next, a detailed description is given of a scheme for the UE to perform measurement for LAA operation according to another embodiment of the present invention.

Figure 7:
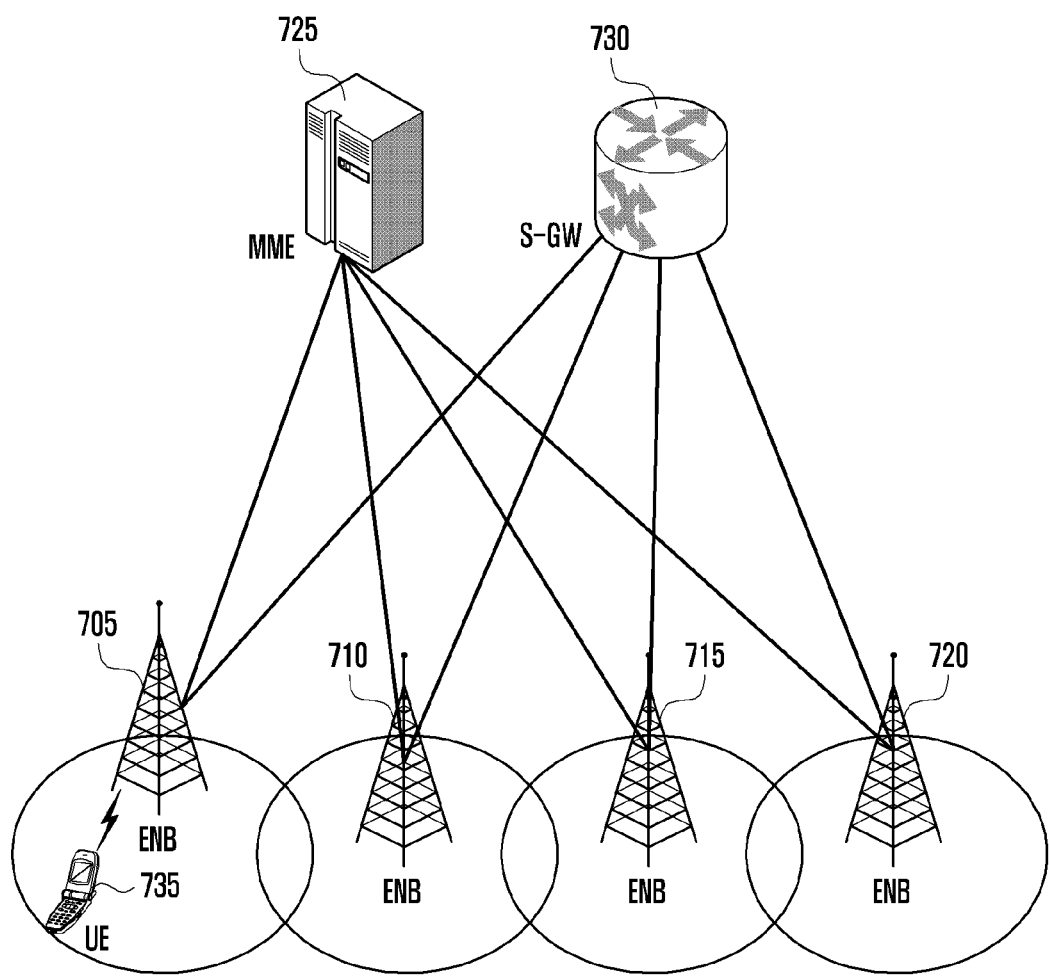
FIG. 7 illustrates an architecture of the 3GPP LTE mobile communication system according to another embodiment of the present invention.

FIG. 7 illustrates an embodiment of the architecture of the LTE mobile communication system. As shown in FIG. 7, the radio access network of the LTE mobile communication system is composed of base stations (Evolved Node Bs, ENBs) 705, 710, 715 and 720, a Mobility Management Entity (MME) 725, and a Serving-Gateway (S-GW) 730. A user equipment (UE) 735 may connect to an external network through the ENBs and the S-GW. The ENBs 705 to 720 correspond to Node Bs of the UMTS system, but perform more complex functions in comparison to existing Node Bs. The ENBs may be connected to the UE 735 through wireless channels. In LTE, all user traffic including real-time services like VoIP (Voice over IP) services is served by shared channels. Hence, it is necessary to perform scheduling on the basis of collected status information of UEs. Each of the ENBs 705 to 720 performs this scheduling function. In most cases, each ENB controls multiple cells. To achieve a data rate of 100 Mbps in a 20 MHz bandwidth, the LTE system utilizes Orthogonal Frequency Division Multiplexing (OFDM) as radio access technology. The LTE system employs Adaptive Modulation and Coding (AMC) to determine the modulation scheme and channel coding rate according to channel states of UEs. The S-GW 730 creates and deletes data bearers under the control of the MME 725. The MME 725 is connected to multiple ENBs and performs various control functions.

In recent years, with rapid advances in wireless communication technologies, mobile communication systems have evolved across generations. To meet explosive growth in traffic demand, various techniques including carrier aggregation (CA) have been introduced. In conventional cases, a single carrier is used in communication between the UE and the ENB. When carrier aggregation is employed, a primary carrier and one or more secondary carriers may be used in communication between the UE and the ENB, significantly increasing the data transfer rate by an amount corresponding to the number of secondary carriers. In LTE, the primary carrier is termed a primary cell (PCell), and a secondary carrier is termed a secondary cell (SCell). For a UE, a single PCell and up to four SCells may be present. For more detailed information about carrier aggregation, refer to 3GPP technical specifications including TS36.300, TS36.331, TS36.321, TS36.322, TS36.323, TS36.211, TS36.212, TS36.213, TS36.133 and TS36.101.

Meanwhile, the LTE system is a communication system that originally operates in a licensed frequency band allocated by the government. Recently, to meet explosive growth in traffic demand, an active discussion is under way about the use of the LTE technology in the unlicensed frequency band, which is currently used for wireless LANs (Wi-Fi), Bluetooth (BT), and the like. This is referred to as Licensed-Assisted Access (LAA) to unlicensed spectrum (3GPP Rel-13 study item). To combine carrier aggregation with LAA, it is possible to consider a scenario where the PCell uses a licensed band frequency and the SCell uses an unlicensed band frequency on the basis of LAA. However, the unlicensed band may also be used by different types of systems such as Wi-Fi and Bluetooth. When the unlicensed band frequency is being used by a non-LTE system such as Wi-Fi or Bluetooth, if signal strength/interference measurement is performed on the unlicensed band frequency for the LTE reference signal (RS) channel, the measurement result for the LTE RS channel may contain errors. If the UE reports the measurement result containing erroneous values to the ENB, the ENB may make a wrong decision regarding SCell addition/release or SCell activation/deactivation owing to errors in signal strength/interference measurements.

Figure 8:
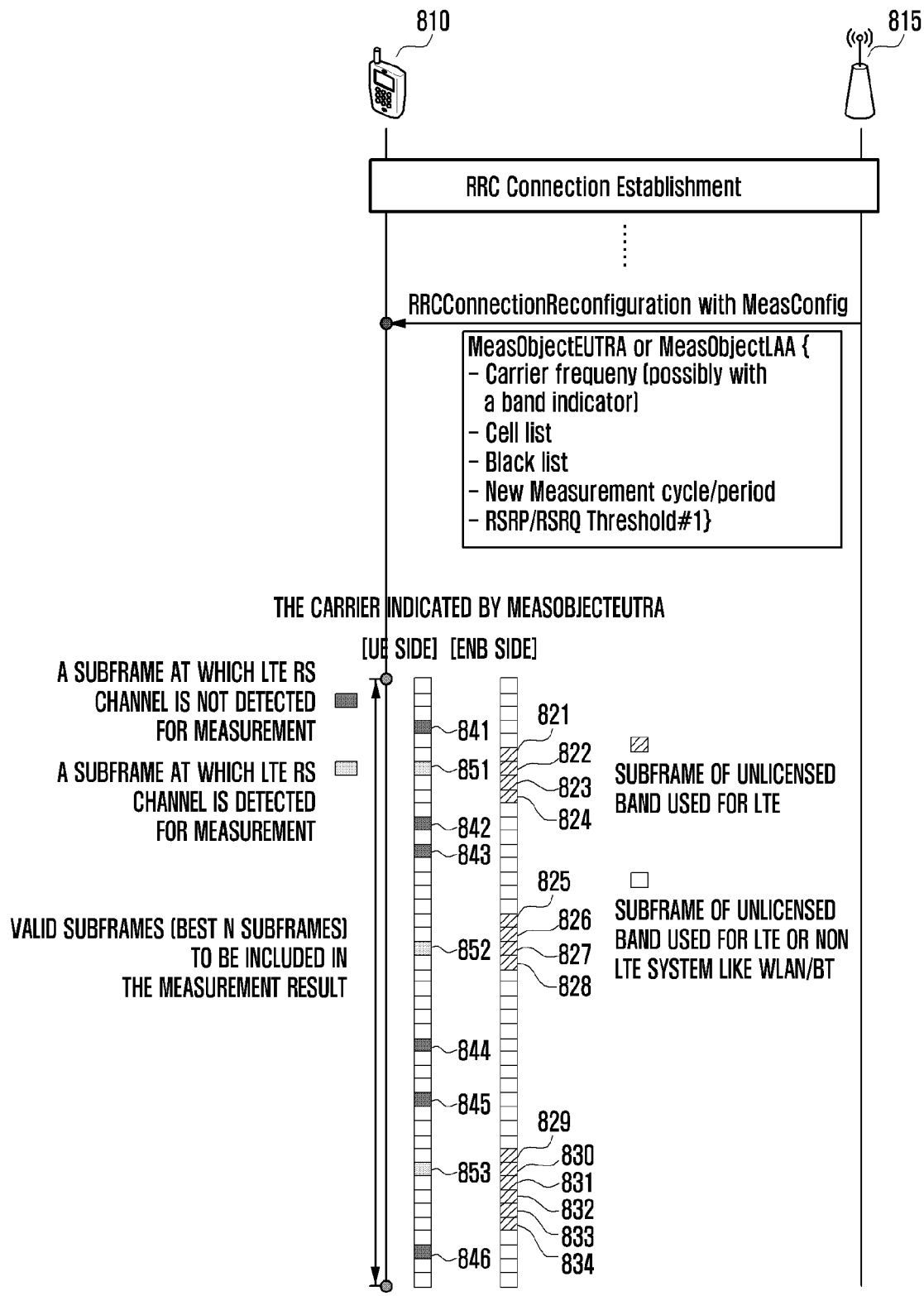
FIG. 8 illustrates a measurement procedure for a UE according to another embodiment of the present invention.

To solve the above problem, FIG. 8 illustrates a measurement procedure for the UE as a proposed embodiment.

In FIG. 8, indicia 810 indicates a UE of the LTE mobile communication system, and indicia 815 indicates an ENB thereof.

The UE may perform a RRC connection establishment procedure with the ENB and enter the RRC-connected state for sending and receiving control messages. Thereafter, the ENB may send a control message (RRCConnectionReconfiguration) to the UE to configure measurement configuration information for serving and neighboring cells/frequencies.

The measurement configuration information may be specified by the MeasConfig information element (IE) in the RRCConnectionReconfiguration control message, and the measurement object (E-UTRA or LTE cells/frequencies to be measured) may be indicated by the MeasObjectEUTRA IE in the MeasConfig.

The unlicensed band frequency available to the LTE technology may be indicated by the MeasObjectEUTRA IE or indicated by a separately defined IE (e.g. MeasObjectLAA IE).

For more detailed information about the RRCConnectionReconfiguration control message, MeasConfig IE and MeasObjectEUTRA IE, refer to the 3GPP technical specification TS36.331.

The measurement configuration information for the unlicensed band frequency specified in the MeasObjectEUTRA or MeasObjectLAA IE may include information regarding the carrier frequency, band indicator, list of cells to be measured (cell list), list of cells not to be measured (black list), new measurement cycle/period, and RSRP (Reference Signal Received Power)/RSRQ (Reference Signal Received Quality) threshold #1.

Specifically, the carrier frequency information may be used to identify the center frequency and band indicator of the band to which the frequency belongs, and may correspond to the ARFCN-ValueEUTRA specified in 3GPP TS36.331 for LTE. The band indicator information indicates the band number of the band to which the frequency belongs. The list of cells to be measured contains physical cell IDs of the cells to be measured, and the list of cells not to be measured contains physical cell IDs of the cells not to be measured.

The measurement cycle/period information indicates the measurement duration to be applied for measurement on the unlicensed band frequency. The UE may produce a measurement value by aggregating and averaging signal strength/interference measurements over multiple subframes during the measurement cycle/period.

For example, the ENB may send the UE measurement cycle/period information in units of subframes. Then, the UE may perform measurement at each subframe indicated by the measurement cycle/period information, compute the average of the measurement values, and report the average value to the ENB.

The RSRP/RSRQ threshold may be used to detect whether the reference signal (RS) to be measured is present at a specific subframe. For example, when the measurement value for the RS to be measured as to RSRP/RSRQ at a specific subframe is greater than (or equal to) the RSRP/RSRQ threshold, it is possible to determine that the RS is present at the subframe. In the present invention, when the measurement value for the RS at a specific subframe is less than (or equal to) the RSRP/RSRQ threshold, it is also possible to determine that the RS is present at the subframe.

The UE may use the RSRP/RSRQ threshold for RS detection at a specific subframe to thereby determine whether to actually perform measurement at the subframe.

When the unlicensed band frequency is used for LTE transmission, the LTE RS may be detected at the corresponding subframe. When the unlicensed band frequency is used for a non-LTE technology like Wi-Fi or Bluetooth, the LTE RS will not be detected at the corresponding subframe.

For example, the UE may measure the RSRP/RSRQ value at one or more subframes indicated by the measurement cycle/period information and compare the measured RSRP/RSRQ value with the RSRP/RSRQ threshold.

When the RSRP/RSRQ value measured at the indicated subframes is greater than or equal to the RSRP/RSRQ threshold, the UE may determine that an LTE RS is present (or detected) at the indicated subframes.

Hence, the UE may perform measurement on the reference signal.

Upon reception of a RRCConnectionReconfiguration message, the UE may perform measurement on the cell or frequency indicated by the MeasObjectEUTRA or MeasObjectLAA.

For example, assume that subframes of the unlicensed band frequency indicated by indicia 821 to 834 are used for LTE transmission and other subframes thereof are used for Wi-Fi or Bluetooth. If the above assumption is not known to the UE, the UE may perform measurement at a subframe randomly selected from those subframes indicated by the measurement cycle/period information contained in the MeasObjectEUTRA or MeasObjectLAA. For instance, assume that the UE has selected subframes indicated by indicia 841 to 846 and 851 to 853 for the measurement purpose. First, the UE has to determine whether a specific subframe is a valid subframe to be included in the measurement result through RS detection. As the subframes 841 to 846 are used by a non-LTE technology like Wi-Fi or Bluetooth, the RSRP/RSRQ value measured at the subframes 841 to 846 will be less than RSRP/RSRQ threshold #1. Hence, the UE may determine that an RS is not detected at the subframes 841 to 846, and regard the subframes 841 to 846 as a subframe to be excluded from the measurement result (invalid subframe). On the contrary, as the subframes 851 to 853 are used for LTE transmission, the RSRP/RSRQ value measured at the subframes 851 to 853 will be greater than RSRP/RSRQ threshold #1. Hence, the UE may determine that an RS is detected at the subframes 851 to 853, and regard the subframes 851 to 853 as a valid subframe to be included in the measurement result.

The UE may produce a measurement value by aggregating and averaging measurements over at least N valid subframes within the measurement cycle/period (N is an integer greater than or equal to 1 and may be a fixed value specified in the standard or a configurable value signaled by the MeasConfig of the RRCConnectionReconfiguration control message).

Although the measurement value is produced in FIG. 8 by using measurements over the three subframes 851 to 853, N may be less than 3. For instance, N may be set to 2. In this case, the measurement value produced by using the three subframes 851 to 853 may be utilized as it is. Alternatively, a new measurement value may be produced by using N valid subframes with measurements in order of best to worst. As another example, assume that N is greater than 3 and only three valid subframes are present during the measurement cycle/period. In this case, the UE may compute a measurement value by using the three valid subframes and report the measurement value to the ENB. Or, the UE may ignore the measurement value obtained during the measurement cycle/period as an invalid value. Upon determining to report such a measurement value, the UE may add an indicator indicating that N is not satisfied to the measurement report to be sent to the ENB.

Figure 9:
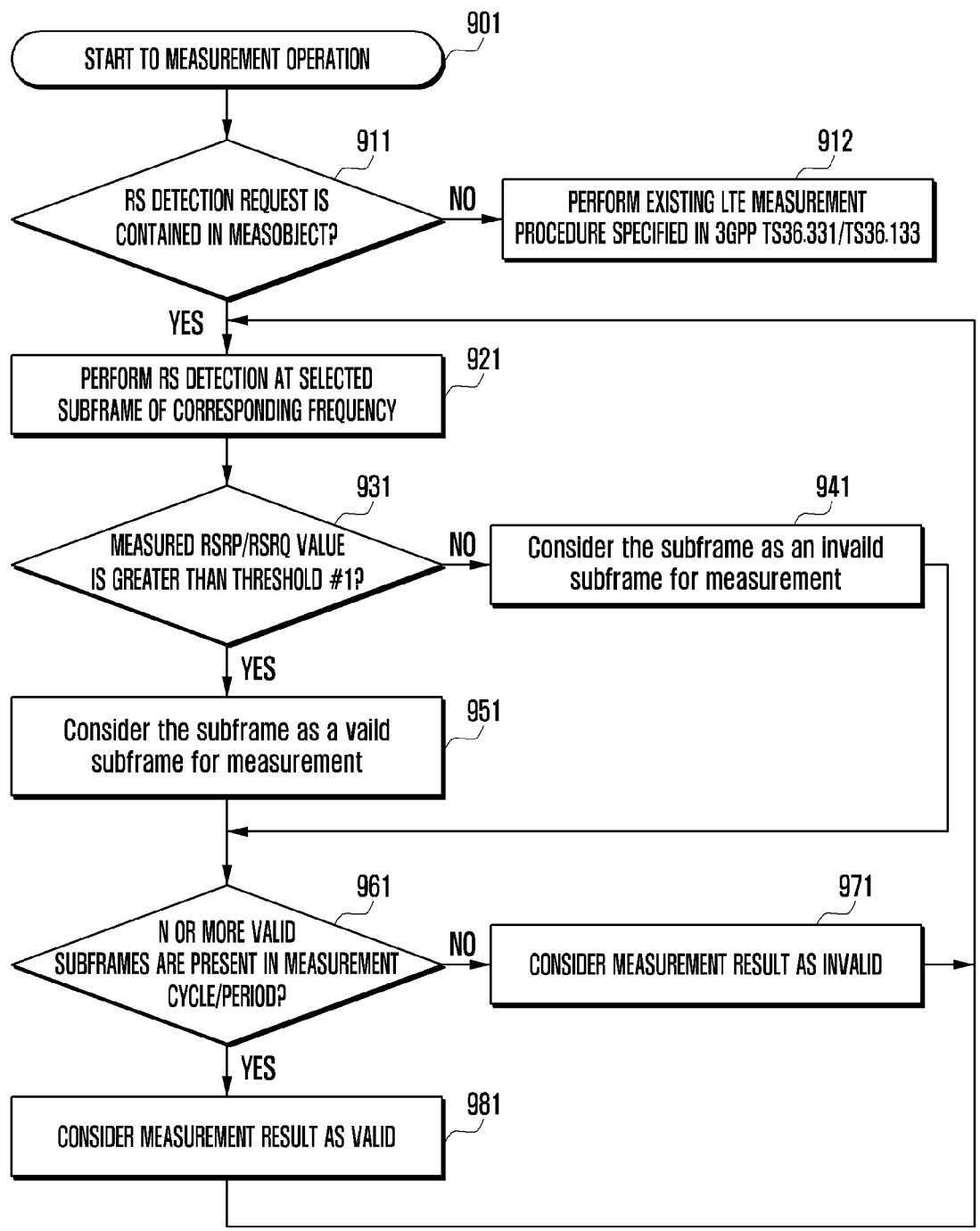
FIG. 9 is a flowchart illustrating operations of the UE according to another embodiment of the present invention.

FIG. 9 is a flowchart illustrating UE operations for the embodiment shown in FIG. 8. At step 901, the UE starts to perform measurement on a given cell/frequency. At step 911, the UE checks whether RS detection is requested by the MeasObject (e.g. MeasObjectEUTRA or MeasObjectLAA) associated with the given cell/frequency.

The request for RS detection may be signaled through a 1-bit indicator or through presence or absence of a specific measurement IE. For example, when the RSRP/RSRQ threshold or the new measurement cycle/period for LAA is present in the MeasObject as shown in FIG. 8, the UE may determine that RS detection is requested for measurement on the cell/frequency.

If RS detection is not requested by the MeasObject, at step 912, the UE performs measurement according to the existing LTE procedure specified in 3GPP TS36.331/TS36.133.

If RS detection is requested by the MeasObject, at step 921, the UE selects a subframe of the cell/frequency and performs RS detection by checking whether the RS is present at the selected subframe.

For example, when the RSRP/RSRQ threshold or the new measurement cycle/period for LAA is present in the received MeasObject, the UE may perform RS detection to check whether the RS is present at the selected subframe.

At step 931, the UE checks whether the measured RSRP/RSRQ value is greater than (or equal to) RSRP/RSRQ threshold #1. If the measured RSRP/RSRQ value is greater than (or equal to) RSRP/RSRQ threshold #1, at step 951, the UE determines that the selected subframe is a valid subframe to be included in the measurement result. If the measured RSRP/RSRQ value is less than (or equal to) RSRP/RSRQ threshold #1, at step 941, the UE determines that the selected subframe is not a valid subframe (invalid subframe) for the measurement result.

By use of information received from the ENB, the UE may compare the RSRP/RSRQ value measured at a subframe indicated by the received information with RSRP/RSRQ threshold #1. If the RSRP/RSRQ value measured at the subframe is greater than or equal to RSRP/RSRQ threshold #1, the UE may regard the subframe as a valid subframe for measurement.

At step 961, the UE checks whether N or more valid subframes are present in the measurement cycle/period (N is an integer greater than or equal to 1 and may be a fixed value specified in the standard or a configurable value signaled by the MeasConfig of the RRCConnectionReconfiguration control message). If N or more valid subframes are present in the measurement cycle/period, at step 981, the UE validates the measurement result obtained by aggregating and averaging measurement values over the valid subframes belonging to the measurement cycle/period and sends a measurement report to the ENB if necessary (e.g. periodic arrival of a measurement reporting time or occurrence of an event for measurement reporting).

If N or more valid subframes are not present in the measurement cycle/period, at step 971, the UE invalidates the measurement result obtained by aggregating and averaging measurement values over the valid subframes belonging to the measurement cycle/period. As an alternative to step 971, as described before in connection with FIG. 8, the UE may validate the measurement result obtained by aggregating and averaging measurement values over the valid subframes belonging to the measurement cycle/period and send a measurement report to the ENB if necessary. However, to report such an insufficient measurement result, the UE may add an indicator indicating that N is not satisfied to the measurement report to be sent to the ENB.

Figure 10:
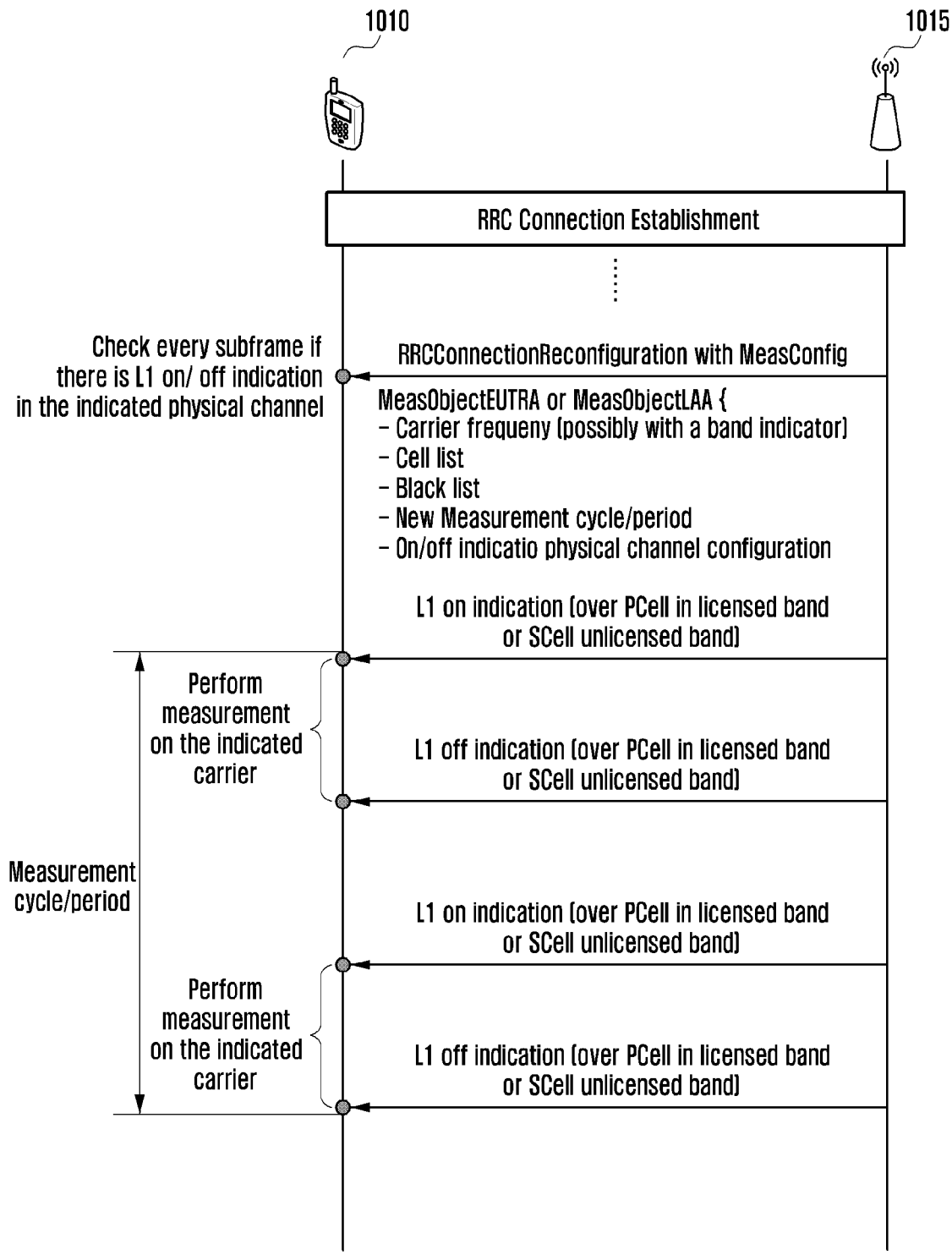
FIG. 10 illustrates a measurement procedure for a UE according to another embodiment of the present invention.

FIG. 10 illustrates a measurement procedure for the UE as another proposed embodiment. In FIG. 10, indicia 1010 indicates a UE of the LTE mobile communication system, and indicia 1015 indicates an ENB thereof. The UE may perform a RRC connection establishment procedure with the ENB and enter the RRC-connected state for sending and receiving control messages. Thereafter, the ENB may send a control message (RRCConnectionReconfiguration) to the UE to configure measurement configuration information for serving and neighboring cells/frequencies.

The measurement configuration information may be specified by the MeasConfig IE in the RRCConnectionReconfiguration control message, and the measurement object (E-UTRA or LTE cells/frequencies to be measured) may be indicated by the MeasObjectEUTRA IE in the MeasConfig. The unlicensed band frequency available to the LTE technology may be indicated by the MeasObjectEUTRA IE or indicated by a separately defined IE (e.g. MeasObjectLAA IE). For more detailed information about the RRCConnectionReconfiguration control message, MeasConfig IE and MeasObjectEUTRA IE, refer to the 3GPP technical specification TS36.331.

The measurement configuration information for the unlicensed band frequency specified in the MeasObjectEUTRA or MeasObjectLAA IE may include information regarding the carrier frequency, band indicator, list of cells to be measured (cell list), list of cells not to be measured (black list), new measurement cycle/period, and on/off indication physical (L1) channel configuration.

Specifically, the carrier frequency information may be used to identify the center frequency and band indicator of the band to which the frequency belongs, and may correspond to the ARFCN-ValueEUTRA specified in 3GPP TS36.331 for LTE. The band indicator information indicates the band number of the band to which the frequency belongs. The list of cells to be measured contains physical cell IDs of the cells to be measured, and the list of cells not to be measured contains physical cell IDs of the cells not to be measured.

The measurement cycle/period information indicates the measurement duration to be applied for measurement on the unlicensed band frequency. The UE may produce a measurement value by aggregating and averaging signal strength/interference measurements over multiple subframes during the measurement cycle/period.

For example, the ENB may send the UE measurement cycle/period information in units of subframes. Then, the UE may perform measurement at each subframe indicated by the measurement cycle/period information, compute the average of the measurement values, and report the average value to the ENB.

The information for on/off indication physical channel configuration is channel configuration information needed to receive the on/off indication, and may be composed of frequency and time domain resource information, coding and scrambling code/sequence generation information for the channel through which the on/off indication is sent (e.g. IDs), and radio network temporary identifier (RNTI) information used to send the on/off indication.

The information for on/off indication physical channel configuration may be not included in the MeasConfig for measurement but included in other radio resource configuration information for transmission.

The on/off indication may be used to notify the UE of the start of use of the unlicensed band frequency for LTE (on indication) or the end of use of the unlicensed band frequency for LTE (off indication). The on/off indication may be a newly designed physical control signaling or be an existing LTE physical control signaling. For example, the on/off indication may be sent by use of existing LTE channels such as Physical Downlink Control Channel (PDCCH), Enhanced PDCCH (ePDCCH) scheduling channel, and Physical Control Format Indicator Channel (PCFICH).

To initiate communication with the UE by use of the LTE technology at the unlicensed band frequency, the ENB may send the on indication to the UE.

After reception of the RRCConnectionReconfiguration message, according to the on/off indication physical channel configuration contained in the MeasObjectEUTRA or MeasObjectLAA, the UE checks whether the L1 on/off signaling is present on the corresponding channel on a subframe basis (at each subframe or at each indicated/signaled subframe). To start use of the unlicensed band frequency for LTE transmission, the ENB will send the L1 on signaling through the corresponding physical channel. To end or suspend use of the unlicensed band frequency for LTE transmission, the ENB will send the L1 off signaling through the corresponding physical channel. The on/off indication may be transmitted through the PCell based on a licensed band frequency or through a SCell based on an unlicensed band frequency.

Upon reception of the L1 on indication through the corresponding channel during the measurement cycle/period, the UE may perform measurement on the cell/frequency (measure the signal strength/interference for the RS at a selected subframe). Upon reception of the L1 off indication through the corresponding channel, the UE does not perform (or stops) measurement on the cell/frequency. The UE may produce a measurement value by aggregating and averaging measurements over at least N valid subframes within the measurement cycle/period (N is an integer greater than or equal to 1 and may be a fixed value specified in the standard or a configurable value signaled by the MeasConfig of the RRCConnectionReconfiguration control message). If measurement is performed only at less than N valid subframes during the measurement cycle/period, the UE may invalidate and ignore the measurement result. Alternatively, the UE may use such an insufficient measurement result. In this case, the UE may add an indicator indicating that N is not satisfied to the measurement report to be sent to the ENB.

Figure 11:
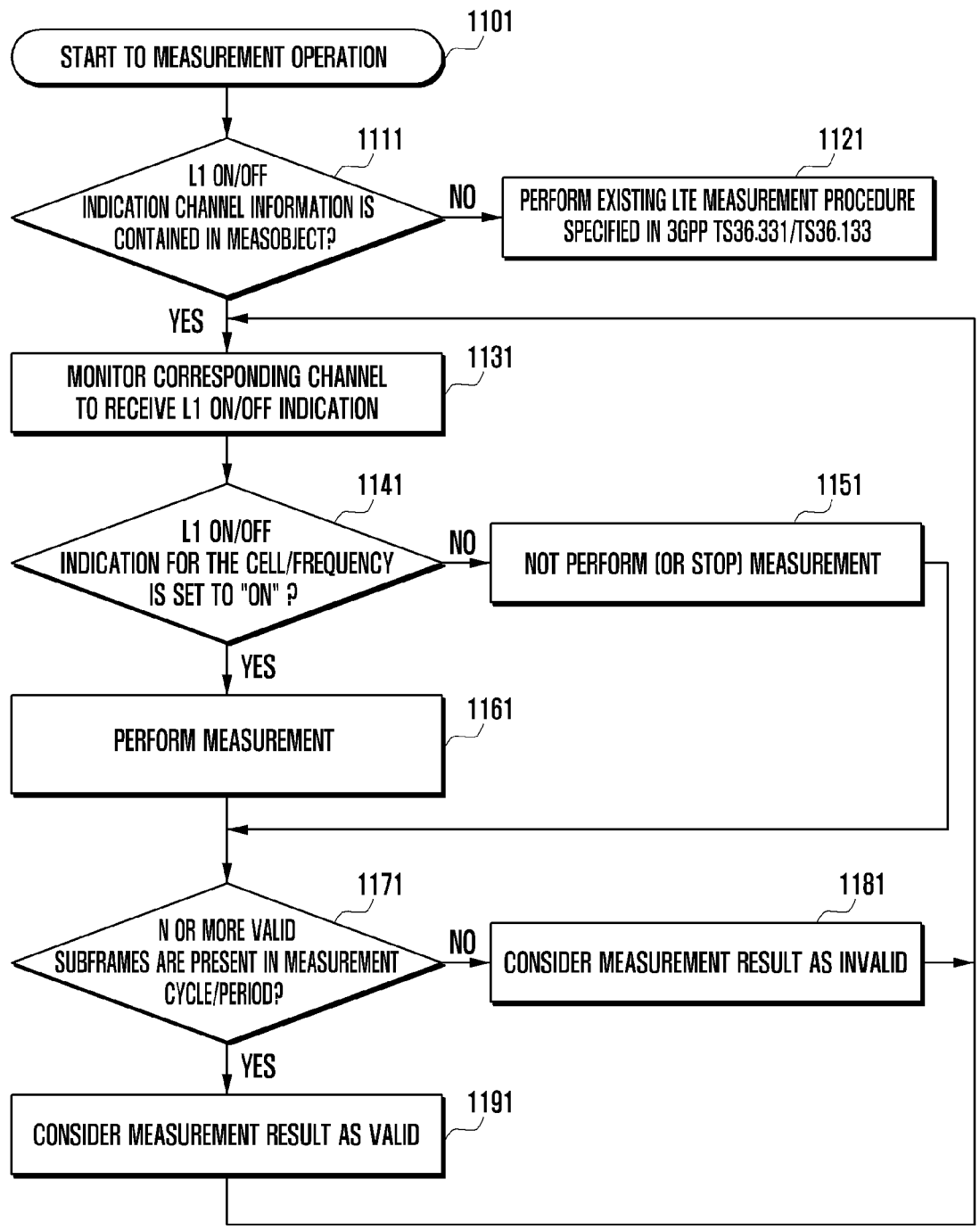
FIG. 11 is a flowchart illustrating operations of the UE according to another embodiment of the present invention.

FIG. 11 is a flowchart illustrating UE operations for the embodiment shown in FIG. 10. At step 1101, the UE starts to perform measurement on a given cell/frequency. At step 1111, the UE checks whether the L1 on/off indication channel information is contained in the MeasObject (e.g. MeasObjectEUTRA or MeasObjectLAA) associated with the given cell/frequency. As described before in connection with FIG. 10, the ENB may send the L1 on/off indication channel configuration not through the MeasObject but through other radio resource information. In this case, the ENB may add an indicator directing measurement using the L1 on/off indication channel to the MeasObject. If the L1 on/off indication channel information (or the indicator directing measurement using the L1 on/off indication channel) is not contained in the MeasObject, at step 1121, the UE performs measurement according to the existing LTE procedure specified in 3GPP TS36.331/TS36.133. If the L1 on/off indication channel information (or the indicator directing measurement using the L1 on/off indication channel) is contained in the MeasObject, at step 1131, the UE monitors the L1 on/off indication channel using the corresponding channel configuration information to receive the L1 on/off indication. At step 1141, the UE checks the received L1 on/off indication. If the L1 on/off indication is set to "on", at step 1161, the UE performs measurement on the RS channel of the cell/frequency. If the L1 on/off indication is set to "off", at step 1151, the UE does not perform or suspends measurement on the RS channel of the cell/frequency. At step 1171, the UE checks whether N or more valid subframes are present in the measurement cycle/period. If N or more valid subframes are not present in the measurement cycle/period, at step 1181, the UE invalidates the measurement result obtained by aggregating and averaging measurement values over the valid subframes belonging to the measurement cycle/period. As an alternative to step 1181, as described before in connection with FIG. 10, the UE may validate the measurement result obtained by aggregating and averaging measurement values over the valid subframes belonging to the measurement cycle/period and send a measurement report to the ENB if necessary. However, to report such an insufficient measurement result, the UE may add an indicator indicating that N is not satisfied to the measurement report to be sent to the ENB. If N or more valid subframes are present in the measurement cycle/period, at step 1191, the UE validates the measurement result obtained by aggregating and averaging measurement values over the valid subframes belonging to the measurement cycle/period and sends a measurement report to the ENB if necessary (e.g. periodic arrival of a measurement reporting time or occurrence of an event for measurement reporting).

Figure 12:
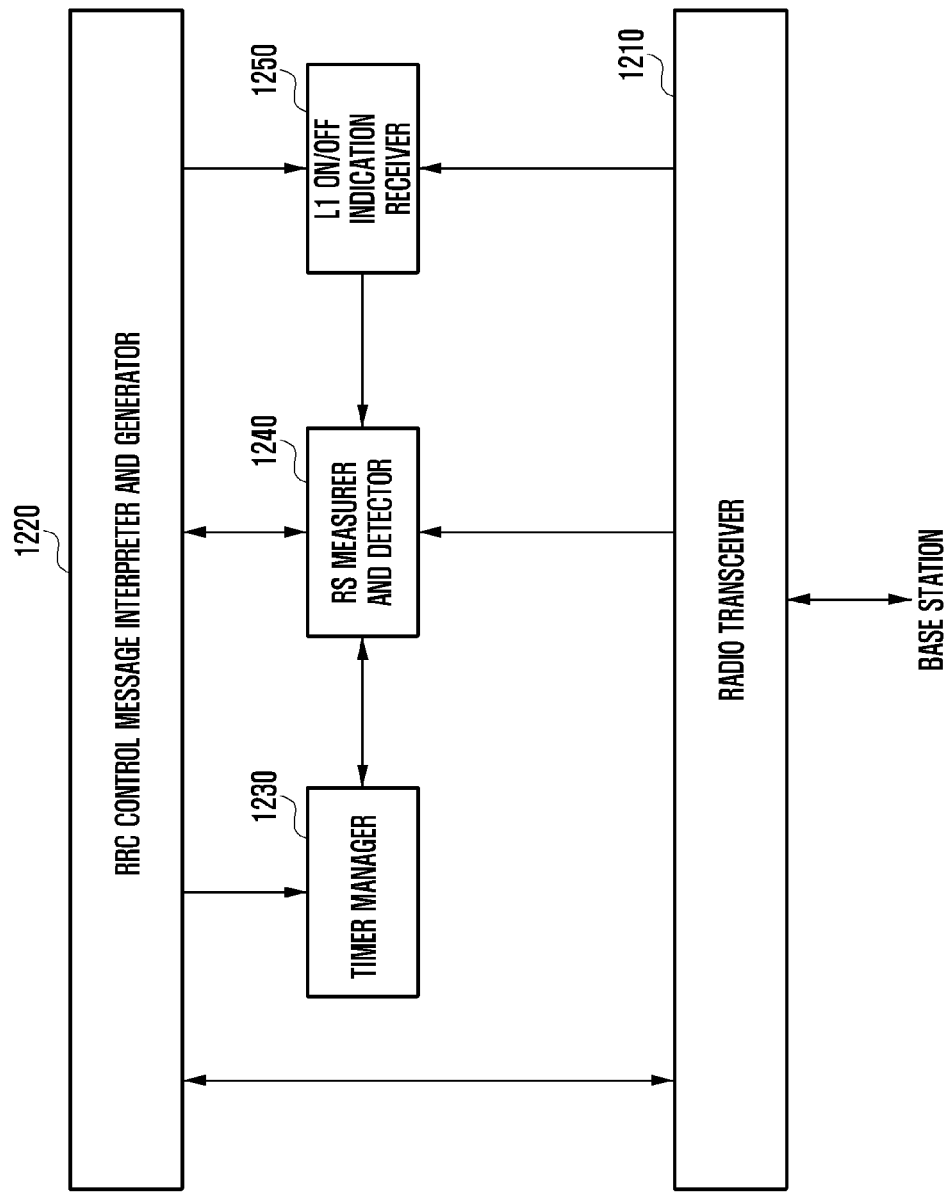
FIG. 12 is a block diagram of a UE according to another embodiment of the present invention.

FIG. 12 is a block diagram of a UE according to various embodiments of the present invention. In FIG. 12, indicia 1210 indicates a radio transceiver. The radio transceiver 1210 may be used to receive a control message, RS channel, and L1 on/off indication channel from the ENB. A RRC control message received through the radio transceiver 1210 is interpreted by a RRC control message interpreter and generator 1220, and the interpreted information may be forwarded to other blocks needing such information. For example, the measurement cycle/period information may be forwarded to the timer manager 1230, the measurement information for a given cell/frequency may be forwarded to the RS measurer and detector 1240, and the L1 on/off indication channel configuration information may be forwarded to the L1 on/off indication receiver 1250. Although the timer manager 1230 is presented as a separate block in FIG. 12, the RS measurer and detector 1240 may process all pieces of measurement information related to a duration, cycle, timer or the like without the timer manager 1230. For a given unlicensed band frequency, the on/off indication received by the L1 on/off indication receiver 1250 may control initiation and suspension of measurement operation performed by the RS measurer and detector 1240. The RS measurer and detector 1240 may perform RS detection to determine whether the RS is present at a specific subframe. Only subframes at which the RS is detected may be regarded as a subframe valid for measurement. The RRC control message interpreter and generator 1220 may forward the information needed for RS detection such as a RSRP/RSRQ threshold.

Figure 13:
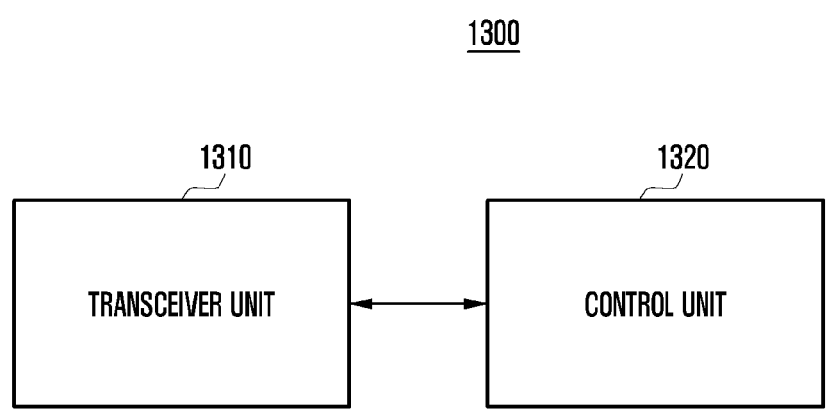
FIG. 13 is a block diagram of a UE according to an embodiment of the present invention.

FIG. 13 is a block diagram of a user equipment (UE) according to an embodiment of the present invention.

As shown in FIG. 13, the UE 1300 may include a transceiver unit 1310 and a control unit 1320. The transceiver unit 1310 may send and receive a signal.

The transceiver unit 1310 may use various communication techniques to communicate with external devices. The transceiver unit 1310 may include various communication chips such as a Wi-Fi chip, Bluetooth chip, NFC chip, and radio communication chip. Here, the Wi-Fi chip, Bluetooth chip and NFC chip support Wi-Fi communication, Bluetooth communication, and NFC communication, respectively. The NFC chip supports Near Field Communication using the 13.56 MHz band among various RFID frequency bands such as 135 kHz, 13.56 MHz, 433 MHz, 860-960 MHz, and 2.45 GHz bands. When the Wi-Fi chip or Bluetooth chip is used, connection information such as SSID and session keys is sent and received to establish a connection first, and then various information may be sent and received through the connection. The radio communication chip may perform communication according to various communication standards such as IEEE, ZigBee, 3G, 3GPP and LTE.

The control unit 1320 may control the overall operation of the UE 1300. The control unit 1320 may control the transceiver unit 1310 to send a first report message containing information on whether the LAA technology is supported by the UE 1300 to the ENB supporting a first communication technology. The control unit 1320 may detect usage of a second communication technology in a first band of the unlicensed spectrum. When usage of the second communication technology in the first band is detected, the control unit 1320 may control the transceiver unit 1310 to send a second report message containing information on usage of the second communication technology to the ENB.

The control unit 1320 may detect a change in the usage state of the second communication technology in the first band. Upon detection of a change in the usage state of the second communication technology, the control unit 1320 may control the transceiver unit 1310 to send a third report message containing information on the usage state change to the ENB.

In addition, the control unit 1320 may detect termination of usage of the second communication technology in the first band. Upon detecting termination of usage of the second communication technology, the control unit 1320 may control the transceiver unit 1310 to send a fourth report message containing information on the usage termination to the ENB, and control the transceiver unit 1310 to receive a resource allocation message containing resource allocation information for using the first communication technology in the first band from the ENB.

The control unit 1320 may receive a measurement configuration message directing measurement configuration on the unlicensed spectrum from the ENB. Upon detecting usage of the second communication technology in a second band of the unlicensed spectrum, the control unit 1320 may control the transceiver unit 1310 to send a fifth report message containing information indicating measurement failure for the second band to the ENB.

Upon detecting termination of usage of the second communication technology in the second band, the control unit 1320 may control the transceiver unit 1310 to send a sixth report message containing information on the usage termination to the ENB. Thereafter, the control unit 1320 may control the transceiver unit 1310 to receive a measurement configuration message directing measurement configuration on the second band from the ENB having received the sixth report message.

After configuring measurement on the second band, the control unit 1320 may control the transceiver unit 1310 to send a seventh report message containing information on the measurement result to the ENB.

The control unit 1320 may control the transceiver unit 1310 to receive a resource allocation message containing resource allocation information for using the first communication technology in the second band according to the seventh report message.

According to another embodiment of the present invention, the control unit 1320 may control the transceiver unit 1310 to receive a message containing information on the threshold of the reference signal strength for measurement on the unlicensed spectrum from the ENB, compare the received signal strength on the unlicensed spectrum with the threshold contained in the received message, and measure the reference signal on the unlicensed spectrum according to the comparison result.

The message may further contain information on the measurement cycle/period for the unlicensed spectrum. The control unit 1320 may perform measurement on the reference signal according to the measurement cycle/period.

The control unit 1320 may identify a subframe at which the reference signal strength is greater than the threshold among subframes belonging to the measurement cycle/period, and perform measurement on the reference signal at the identified subframe.

The message may further contain information on the number of subframes to be measured on the unlicensed spectrum. The control unit 1320 may check whether the number of reference signal measurements performed on the unlicensed spectrum is greater than or equal to the number of subframes to be measured. If the number of reference signal measurements performed on the unlicensed spectrum is greater than or equal to the number of subframes to be measured, the control unit 1320 may control the transceiver unit 1310 to send a report message containing information on the measurement result to the ENB.

The control unit 1320 may check whether at least one of an indicator directing measurement on the unlicensed spectrum and an indicator indicating downlink data transmission via the unlicensed spectrum is contained in the message. If at least one of the indicators is contained in the message, the control unit 1320 may control reference signal measurement on the unlicensed spectrum.

Figure 14:
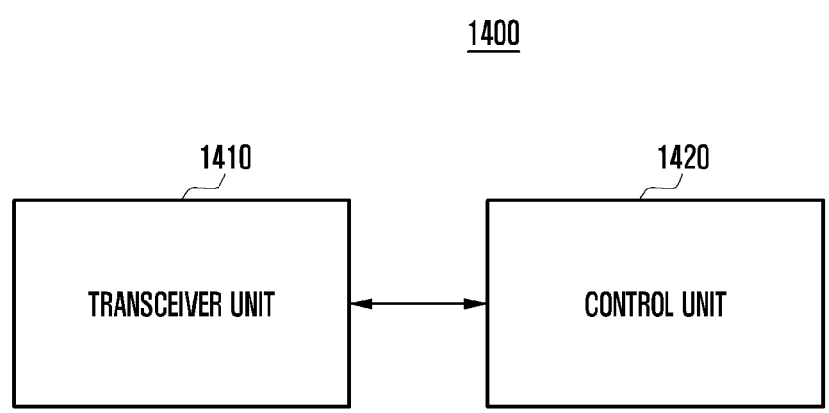
FIG. 14 is a block diagram of an ENB according to an embodiment of the present invention.

FIG. 14 is a block diagram of a base station (ENB) according to an embodiment of the present invention. As shown in FIG. 14, the ENB 1400 may include a transceiver unit 1410 and a control unit 1420.

The transceiver unit 1410 may communicate with an external electronic device.

The control unit 1420 may control the overall operation of the ENB 1400.

In one embodiment of the present invention, the control unit 1420 may control the transceiver unit 1410 to receive a first report message containing information on whether the LAA technology is supported by a UE from the UE and to receive a second report message containing information on usage of the second communication technology from the UE. The control unit 1420 may determine not to allocate resources for using the first communication technology in the first band according to the second report message.

The control unit 1420 may control the transceiver unit 1410 to send a measurement configuration message directing measurement configuration on the unlicensed spectrum to the UE and to receive, from the UE having detected usage of the second communication technology in the second band, a third report message containing information indicating measurement failure for the second band.

In another embodiment of the present invention, the control unit 1420 may control the transceiver unit 1410 to send a message containing information on the threshold of the reference signal strength for measurement on the unlicensed spectrum.

The information on the threshold of the reference signal strength enables the UE to compare the received signal strength on the unlicensed spectrum with the threshold contained in the received message, and to measure the reference signal on the unlicensed spectrum according to the comparison result.

The message sent by the transceiver unit 1410 may further contain information on the measurement cycle/period for the unlicensed spectrum.

The message sent by the transceiver unit 1410 may further contain information on the number of subframes to be measured on the unlicensed spectrum. The control unit 1420 may control the transceiver unit 1410 to receive a report message containing information on the result of measurement performed at the specified number of subframes.

The message sent by the transceiver unit 1410 may further contain at least one of an indicator directing measurement on the unlicensed spectrum and an indicator indicating downlink data transmission via the unlicensed spectrum.

In a feature of the present invention, the proposed method enables the unlicensed band to be utilized simultaneously by different technologies such as LAA cell and wireless LAN or to be utilized only by one thereof if a collision occurs. Thereby, the unlicensed band can be utilized by the LAA (Licensed-Assisted Access) technology and other different technologies.

REFERENCE SYMBOLS FOR MAJOR PARTS OF DRAWINGS

101: UE 103: eNB

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method by a terminal in a wireless communication system, the method comprising:
   transmitting, to a base station, a first message including information indicating that the terminal supports a licensed-assisted access (LAA) operation on a frequency band;
   receiving, from the base station, a second message configuring a measurement on the frequency band;
   determining that an in-device coexistence interference between the LAA operation and a wireless local access network (WLAN) operation has occurred in the terminal, as a result of a hardware sharing between the LAA operation and the WLAN operation; and
   transmitting, to the base station, a third message for reporting the in-device coexistence interference,
   wherein the third message includes first information for a carrier frequency associated with the in-device coexistence interference from the frequency band, second information for a cause of the in-device coexistence interference and third information for a radio access technology (RAT) associated with the in-device coexistence interference,
   wherein the second information indicates that the cause of the in-device coexistence interference is the hardware sharing between the LAA operation and the WLAN operation, and
   wherein a fourth message for reporting a stoppage of the in-device coexistence interference is transmitted to the base station, in case that the in-device coexistence interference is stopped.

2. The method of claim 1, further comprising detecting a change in a usage state for the frequency band based on a WLAN stop command received from a user of the terminal.

3. The method of claim 1,
   wherein the third message indicates a failure of the measurement on the frequency band by the in-device coexistence interference.

4. The method of claim 1, wherein the third message is a radio resource control (RRC) signaling.

5. A method by a base station in a wireless communication system, the method comprising:
   receiving, from a terminal, a first message including information indicating that the terminal supports a licensed-assisted access (LAA) operation on a frequency band;
   transmitting, to the terminal, a second message configuring a measurement on the frequency band; and
   receiving, from the terminal, a third message for reporting an in-device coexistence interference between the LAA operation and a wireless local access network (WLAN) operation,
   wherein the third message is received based on the in-device coexistence interference between the LAA operation and the WLAN operation having occurred in the terminal, as a result of a hardware sharing between the LAA operation and the WLAN operation,
   wherein the third message includes first information for a carrier frequency associated with the in-device coexistence interference from the frequency band, second information for a cause of the in-device coexistence interference and third information for a radio access technology (RAT) associated with the in-device coexistence interference,
   wherein the second information indicates that the cause of the in-device coexistence interference is the hardware sharing between the LAA operation and the WLAN operation, and wherein a fourth message for reporting a stoppage of the in-device coexistence interference is received from the terminal, in case that the in-device coexistence interference is stopped.

6. The method of claim 5, further comprising detecting a change in a usage state for the frequency band based on a WLAN stop command received from a user of the terminal.

7. The method of claim 5, wherein the third message indicates a failure of the measurement on the frequency band by the in-device coexistence interference.

8. The method of claim 5, wherein the third message is a radio resource control (RRC) signaling.

9. A terminal in a wireless communication system, the terminal comprising:
a transceiver configured to transmit and receive a signal; and
a controller configured to:
transmit, to a base station, a first message including information indicating that the terminal supports a licensed-assisted access (LAA) operation on a frequency band,
receive, from the base station, a second message configuring a measurement on the frequency band,
determine that an in-device coexistence interference between the LAA operation and a wireless local access network (WLAN) operation has occurred in the terminal, as a result of a hardware sharing between the LAA operation and the WLAN operation, and
transmit, to the base station, a third message for reporting the in-device coexistence interference,
wherein the third message includes first information for a carrier frequency associated with the in-device coexistence interference from the frequency band, second information for a cause of the in-device coexistence interference and third information for a radio access technology (RAT) associated with the in-device coexistence interference,
wherein the second information indicates that the cause of the in-device coexistence interference is the hardware sharing between the LAA operation and the WLAN operation, and
wherein a fourth message for reporting a stoppage of the in-device coexistence interference is transmitted to the base station, in case that the in-device coexistence interference is stopped.

10. The terminal of claim 9, wherein the controller is further configured to detect a change in a usage state for the frequency band based on a WLAN stop command received from a user of the terminal.

11. The terminal of claim 9, wherein the third message indicates a failure of the measurement on the frequency band by the in-device coexistence interference.

12. The terminal of claim 9, wherein the third message is a radio resource control (RRC) signaling.

13. A base station in a wireless communication system, the base station comprising:
a transceiver configured to transmit and receive a signal; and
a controller configured to:
receive, from a terminal, a first message including information indicating that the terminal supports a licensed-assisted access (LAA) operation on a frequency band,
transmit, to the terminal, a second message configuring a measurement on the frequency band, and
receive, from the terminal, a third message for reporting an in-device coexistence interference between the LAA operation and a wireless local access network (WLAN) operation,
wherein the third message is received based on the in-device coexistence interference between the LAA operation and the WLAN operation having occurred in the terminal, as a result of a hardware sharing between the LAA operation and the WLAN operation,
wherein the third message includes first information for a carrier frequency associated with the in-device coexistence interference from the frequency band, second information for a cause of the in-device coexistence interference and third information for a radio access technology (RAT) associated with the in-device coexistence interference,
wherein the second information indicates that the cause of the in-device coexistence interference is the hardware sharing between the LAA operation and the WLAN operation, and
wherein a fourth message for reporting a stoppage of the in-device coexistence interference is received from the terminal, in case that the in-device coexistence interference is stopped.

14. The base station of claim 13, wherein the controller is configured to detect a change in a usage state for the frequency band based on a WLAN stop command received from a user of the terminal.

15. The base station of claim 13, wherein the third message indicates a failure of the measurement on the frequency band by the in-device coexistence interference.

16. The base station of claim 13, wherein the third message is a radio resource control (RRC) signaling.

* * * * *